(12) United States Patent
Li

(10) Patent No.: US 10,841,875 B2
(45) Date of Patent: Nov. 17, 2020

(54) DATA TRANSMISSION METHOD AND APPARATUS

(71) Applicant: HUAWEI TECHNOLOGIES CO., LTD., Guangdong (CN)

(72) Inventor: Yanchun Li, Boulogne Billancourt (FR)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 7 days.

(21) Appl. No.: 16/279,098

(22) Filed: Feb. 19, 2019

(65) Prior Publication Data

US 2019/0182770 A1 Jun. 13, 2019

Related U.S. Application Data

(63) Continuation of application No. PCT/CN2017/097369, filed on Aug. 14, 2017.

(30) Foreign Application Priority Data

Aug. 31, 2016 (CN) .......................... 2016 1 0798922

(51) Int. Cl.
*H04W 52/02* (2009.01)
*H04W 8/00* (2009.01)
(Continued)

(52) U.S. Cl.
CPC ....... *H04W 52/0212* (2013.01); *H04W 8/005* (2013.01); *H04W 24/10* (2013.01);
(Continued)

(58) Field of Classification Search
CPC ....... H04W 52/02; H04W 8/00; H04W 24/10; H04W 52/0212; H04W 88/10; H04W 8/005
See application file for complete search history.

(56) References Cited

U.S. PATENT DOCUMENTS

2007/0171894 A1* 7/2007 Han ...................... H04W 88/06
370/352
2013/0182693 A1* 7/2013 Sperling ............... H04W 12/06
370/338

(Continued)

FOREIGN PATENT DOCUMENTS

CN 104584649 A 4/2015
CN 104737597 A 6/2015

(Continued)

OTHER PUBLICATIONS

3GPP TSG-RAN WG2 Meeting #76, R2-116305,Fujitsu:"DRX based solution for LTE+WiFi offload (power saving mode)", San Francisco, USA, Nov. 14-18, 2011. 4 pages.

(Continued)

*Primary Examiner* — Chi Ho A Lee
(74) *Attorney, Agent, or Firm* — Westerman, Hattori, Daniels & Adrian, LLP

(57) ABSTRACT

Embodiments of this application disclose a data transmission method and apparatus, and the method includes receiving, by a receive end by using secondary radio, a feature narrowband signal sent by a transmit end, enabling, by the receive end, primary radio based on the feature narrowband signal, where a receiving bandwidth of the secondary radio is less than a receiving bandwidth and a sending bandwidth of the primary radio, and sending, by the receive end, a first broadband signal to the transmit end by using the primary radio, where the first broadband signal is used to notify the transmit end that the receive end has enabled the primary radio. According to the data transmission method in the embodiments of this application, the transmit end may determine, by using feedback (for example, the first broadband signal) from the receive end, that the receive end has enabled the primary radio.

16 Claims, 6 Drawing Sheets

(51) Int. Cl.
 *H04W 24/10* (2009.01)
 *H04W 88/10* (2009.01)
(52) U.S. Cl.
 CPC ......... *H04W 52/02* (2013.01); *H04W 52/028* (2013.01); *H04W 52/0229* (2013.01); *H04W 88/10* (2013.01); *Y02D 70/00* (2018.01)

(56) References Cited

U.S. PATENT DOCUMENTS

| | | | |
|---|---|---|---|
| 2013/0279375 A1* | 10/2013 | Newberg | H04W 88/16 370/260 |
| 2014/0112225 A1 | 4/2014 | Jafarian et al. | |
| 2014/0112229 A1 | 4/2014 | Merlin et al. | |
| 2014/0119410 A1 | 5/2014 | Tian et al. | |
| 2014/0254349 A1 | 9/2014 | Jia et al. | |
| 2015/0055516 A1* | 2/2015 | Smadi | H04W 72/1215 370/280 |
| 2015/0230275 A1* | 8/2015 | Kerpez | H04W 28/08 370/329 |
| 2015/0319596 A1 | 11/2015 | Qi et al. | |
| 2016/0007247 A1* | 1/2016 | Lee | H04W 36/0072 370/331 |
| 2016/0149679 A1* | 5/2016 | Frenne | H04L 5/005 370/329 |
| 2017/0048918 A1* | 2/2017 | Iwamura | H04L 61/6022 |
| 2018/0092117 A1* | 3/2018 | Azizi | H04W 76/27 |
| 2018/0097680 A1* | 4/2018 | Di Taranto | H04L 27/2602 |
| 2018/0302854 A1 | 10/2018 | Ramamurthy et al. | |
| 2018/0324576 A1* | 11/2018 | Salkintzis | H04W 60/06 |
| 2019/0052445 A1* | 2/2019 | Rantala | H04W 72/12 |
| 2019/0320395 A1* | 10/2019 | Wong | H04W 52/265 |

FOREIGN PATENT DOCUMENTS

| | | |
|---|---|---|
| CN | 104756560 A | 7/2015 |
| CN | 104796971 A | 7/2015 |
| EP | 2833680 A1 | 2/2015 |
| WO | 2012/049064 A1 | 4/2012 |

OTHER PUBLICATIONS

Doudou Messaoud et al. "Survey on Latency Issues of Asynchronous MAC Protocols in Delay-Sensitive Wireless Sensor Networks", 2012 IEEE Communications Surveys & Tutorials (23 pages).

Gong Bingqing et al. "Design of a Low Power Radio-triggered Wake-up Circuit", Electronic Science and Technology, Oct. 2013 with English abstract (5 pages).

* cited by examiner

DATA TRANSMISSION METHOD AND APPARATUS

CROSS-REFERENCE TO RELATED APPLICATIONS

This application is a continuation of International Application No. PCT/CN2017/097369, filed on Aug. 14, 2017, which claims priority to Chinese Patent Application No. 201610798922.0, filed on Aug. 31, 2016. The disclosures of the aforementioned applications are hereby incorporated by reference in their entireties.

TECHNICAL FIELD

This application relates to the communications field, and more specifically, to a data transmission method and apparatus.

BACKGROUND

One wireless communications device may have a plurality of different types of radio. Different types of radio have different transmission rates and different standby power consumption, and therefore, operating power consumption of the wireless communications device may be reduced by using the difference. A station (station, STA) has two sets of radio: primary radio and secondary radio (or referred to as wake-up radio). The wake-up radio has a receiving capability, and the primary radio has both a sending capability and a receiving capability. When no data needs to be transmitted, the STA is usually in a sleep state. When an access point (access point, AP) needs to send downlink data to the STA, the AP first sends a wake-up signal. After receiving the wake-up signal, the secondary radio of the STA may send a wake-up message (an output terminal provides a voltage or a current) to a main control chip, and the main control chip enables the primary radio. Alternatively, the STA may directly send the wake-up message to the primary radio, to enable the primary radio. After being enabled, the primary radio of the STA may receive the downlink data sent by the AP.

However, in the foregoing technical solution, the AP cannot effectively learn whether the STA is within a coverage area of the secondary radio. The AP still sends the downlink data even if the STA is not within the coverage area of the secondary radio, and the STA cannot successfully receive the downlink data sent by the AP. Consequently, data transmission is unreliable.

SUMMARY

Embodiments of this application provide a data transmission method, so as to improve downlink transmission reliability.

According to a first aspect, a data transmission method is provided, and the method includes: receiving, by a receive end by using secondary radio, a feature narrowband signal sent by a transmit end; enabling, by the receive end, primary radio based on the feature narrowband signal, where a receiving bandwidth of the secondary radio is less than a receiving bandwidth and a sending bandwidth of the primary radio; and sending, by the receive end, a first broadband signal to the transmit end by using the primary radio, where the first broadband signal is used to notify the transmit end that the receive end has enabled the primary radio.

In the foregoing operation, if the receive end does not successfully receive the feature narrowband signal, data subsequently sent by the transmit end cannot be successfully received because the receive end does not successfully enable the primary radio. To avoid a case in which the transmit end indiscriminately sends data, the transmit end needs to send data when learning that the receive end has enabled the primary radio. In one embodiment, after enabling the primary radio, the receive end may send the first broadband signal to the transmit end by using the primary radio, to feed back to the transmit end that the receive end has enabled the primary radio. In this case, after receiving the first broadband signal, the transmit end may determine that the receive end has enabled the primary radio, and is able to receive data. Subsequently, the transmit end may send data to the receive end. However, if the transmit end does not receive the first broadband signal within a period of time after sending the feature narrowband signal, the transmit end may resend the feature narrowband signal to wake up the receive end.

Therefore, according to the data transmission method in this embodiment of this application, the transmit end may determine, by using feedback (for example, the first broadband signal) from the receive end, that the receive end has enabled the primary radio. In this case, the transmit end may send data to the receive end after ensuring that the receive end enables the primary radio, so that downlink transmission reliability of the transmit end can be improved.

In one embodiment, the feature narrowband signal may carry first instruction information, and the first instruction information is used to instruct the receive end to send the first broadband signal to the transmit end after receiving the feature narrowband signal.

This is a manner in which the receive end feeds back to the transmit end that the receive end has enabled the primary radio in this embodiment of this application.

In one embodiment, the feature narrowband signal may carry second instruction information, and the second instruction information may be used to instruct the receive end to send the first broadband signal to the transmit end after receiving a second broadband signal sent by the transmit end; and before the sending, by the receive end, a first broadband signal to the transmit end by using the primary radio, the method may further include: receiving, by the receive end, the second broadband signal sent by the transmit end, where the second broadband signal carries query information and transmission indication information, the query information is used to determine whether the receive end has enabled the primary radio, the transmission indication information is used to indicate a transmission manner in which the receive end sends the first broadband signal to the transmit end by using the primary radio, and the transmission manner includes at least one piece of the following information about the first broadband signal: a sending time, an end time, a sending frequency, and a modulation and coding scheme.

This is another manner in which the receive end feeds back to the transmit end that the receive end has enabled the primary radio in this embodiment of this application.

In one embodiment, before the receiving, by a receive end by using secondary radio, a feature narrowband signal sent by a transmit end, the method may further include: receiving, by the receive end, a beacon narrowband signal sent by the transmit end; sending, by the receive end, a measurement report to the transmit end, where the measurement report is used to notify of a signal measurement result and/or a channel measurement result; and receiving, by the receive end, wake-up configuration information sent by the transmit end based on the measurement report, where the wake-up configuration information is used to indicate feature information of the feature narrowband signal.

According to the data transmission method in this embodiment of this application, the receive end may periodically or aperiodically measure the beacon narrowband signal, and report the measurement report to the transmit end, so that the transmit end may determine the feature narrowband signal based on the measurement report, to ensure that the transmit end can accurately wake up the receive end.

In one embodiment, the feature information includes at least one piece of the following information about the feature narrowband signal:

a sending frequency, a sending waveform, a modulation and coding scheme, spread spectrum information, or a quantity of sending repetition times.

In one embodiment, the method may further include: disabling, by the receive end, the primary radio when the receive end does not receive, within a first preset time period after the receive end sends the first broadband signal or within a second preset time period after the receive end sends the first broadband signal a preset quantity of times, data sent by the transmit end or a response message sent by the transmit end to respond to the first broadband signal.

To ensure a receiving success rate of the transmit end, the receive end may also consecutively send the first broadband signal the preset quantity of times. After sending the first broadband signal or sending the first broadband signal the preset quantity of times, the receive end may maintain a state in which the primary radio is enabled, and wait to receive the data or the response message sent by the transmit end. If the receive end does not receive, in a period of time (for example, the first preset time period or the second preset time period), the data or the response message sent by the transmit end, the receive end may disable the primary radio, and keep listening by using the secondary radio. In this way, power consumption of the receive end can be reduced, and standby duration can be extended.

In one embodiment, the method may further include: receiving, by the receive end, the response message sent by the transmit end, where the response message is used to notify that the transmit end successfully receives the first broadband signal.

In one embodiment, the method may further include: disabling, by the receive end, the primary radio when the receive end does not receive, within a third preset time period after the receive end receives the response message, the data sent by the transmit end. In this way, power consumption of the receive end can be reduced, and standby duration can be extended.

In one embodiment, before the receiving, by the receive end, the response message sent by the transmit end, the method may further include: disabling, by the receive end, the primary radio after the receive end sends the first broadband signal; and the receiving, by the receive end, the response message sent by the transmit end includes: receiving, by the receive end, a response narrowband signal sent by the transmit end, where the response narrowband signal carries the response message; and enabling, by the receive end, the primary radio based on the response narrowband signal.

The receive end needs to enable the primary radio to receive the response message from the transmit end, and receiving performed by using the primary radio consumes a larger amount of electricity. Therefore, to save an amount of electricity, the receive end may disable the primary radio after sending the first broadband signal, and receive, by using the secondary radio, a narrowband signal that is sent by the transmit end and that carries the response message, namely, the response narrowband signal. The receive end may enable the primary radio again after receiving the response narrowband signal.

In one embodiment, before the sending, by the receive end, a first broadband signal to the transmit end by using the primary radio, the method may further include: receiving, by the receive end by using the primary radio, third indication information sent by the transmit end; and determining, by the receive end, to enable the primary radio when the receive end detects that the third indication information includes identification information of the receive end; or disabling, by the receive end, the primary radio when the receive end detects that the third indication information does not include identification information of the receive end; and the sending, by the receive end, a first broadband signal to the transmit end by using the primary radio includes: when the third indication information includes the identification information of the receive end, sending, by the receive end, the first broadband signal to the transmit end by using the primary radio.

In this embodiment of this application, a group of receive ends that include the receive end may be woken up by using a same feature narrowband signal. When the transmit end needs to send a multicast message to the group of receive ends, the transmit end may wake up the receive ends by using the feature narrowband signal. However, when there is to-be-received downlink data for only one receive end in the group of receive ends, both a receive end that the transmit end is intended to wake up and for which there is data and another STA in the group are woken up. To avoid this case, the transmit end may send the third indication information to the receive end after sending the feature narrowband signal, to further indicate, by using the third indication information, the receive end that needs to be woken up. In this case, the receive end disables the primary radio when the receive end detects that the third indication information does not include the identification information of the receive end, so that power consumption can be reduced. However, a state in which the primary radio is enabled is kept when the receive end detects that the third indication information includes the identification information of the receive end.

In one embodiment, when the third indication information includes the identification information of the receive end, the third indication information further includes time information, and the time information is used to indicate a moment at which the transmit end sends the data; and the method may further include: disabling, by the receive end, the primary radio after sending the first broadband signal; and enabling, by the receive end, the primary radio at the moment at which the transmit end sends the data, and receiving, by using the primary radio, the data sent by the transmit end.

The receive end enables the primary radio at the moment at which the transmit end sends the data, to receive the data sent by the transmit end, and does not maintain a state in which continuous listening is performed by using the primary radio, so that power consumption can be reduced.

In one embodiment, when the third indication information includes the identification information of the receive end, the third indication information may further include a physical layer protocol data unit (physical layer protocol data unit, PPDU) format used when the receive end sends the first broadband signal to the transmit end. The PPDU format includes the modulation and coding scheme of the first broadband signal, and/or time information of sending the first broadband signal by the transmit end.

According to a second aspect, a data transmission method is provided, and the method includes: sending, by a transmit end, a feature narrowband signal to a receive end, where the feature narrowband signal is used to enable primary radio of the receive end, the receive end further includes secondary radio, and a receiving bandwidth of the secondary radio is less than a receiving bandwidth and a sending bandwidth of the primary radio; and receiving, by the transmit end, a first broadband signal sent by the receive end based on the feature narrowband signal, where the first broadband signal is used to notify that the receive end has enabled the primary radio.

Therefore, according to the data transmission method in this embodiment of this application, the transmit end may determine, by using feedback (for example, the first broadband signal) from the receive end, that the receive end has enabled the primary radio. In this case, the transmit end may send data to the receive end after ensuring that the receive end enables the primary radio, so that downlink transmission reliability of the transmit end can be improved.

In one embodiment, the feature narrowband signal may carry first instruction information, and the first instruction information is used to instruct the receive end to send the first broadband signal to the transmit end after receiving the feature narrowband signal.

In one embodiment, the feature narrowband signal may carry second instruction information, and the second instruction information is used to instruct the receive end to send the first broadband signal to the transmit end after receiving a second broadband signal sent by the transmit end; and before the receiving, by the transmit end, a first broadband signal sent by the receive end based on the feature narrowband signal, the method further includes: sending, by the transmit end, the second broadband signal to the receive end, where the second broadband signal carries query information and transmission indication information, the query information is used to determine whether the receive end has enabled the primary radio, the transmission indication information is used to indicate a transmission manner in which the receive end sends the first broadband signal to the transmit end by using the primary radio, and the transmission manner includes at least one piece of the following information about the first broadband signal: a sending time, an end time, a sending frequency, and a modulation and coding scheme.

In one embodiment, before the sending, by a transmit end, a feature narrowband signal to a receive end, the method may further include: sending, by the transmit end, a beacon narrowband signal to the receive end; receiving, by the transmit end, a measurement report sent by the receive end, where the measurement report is used to notify of a signal measurement result and/or a channel measurement result; determining, by the transmit end, the feature narrowband signal based on the measurement report; and sending, by the transmit end, wake-up configuration information to the receive end, where the wake-up configuration information is used to indicate feature information of the feature narrowband signal.

According to the data transmission method in this embodiment of this application, the receive end may periodically or aperiodically measure the beacon narrowband signal, and report the measurement report to the transmit end, so that the transmit end may determine the feature narrowband signal based on the measurement report, to ensure that the transmit end can accurately wake up the receive end.

In one embodiment, the feature information includes at least one piece of the following information about the feature narrowband signal: a sending frequency, a sending waveform, a modulation and coding scheme, spread spectrum information, or a quantity of sending repetition times.

In one embodiment, the method may further include: sending, by the transmit end, a response message to the receive end, where the response message is used to notify that the transmit end successfully receives the first broadband signal.

In one embodiment, the sending, by the transmit end, a response message to the receive end includes: sending, by the transmit end, a response narrowband signal to the receive end, where the response narrowband signal carries the response message.

The receive end needs to enable the primary radio to receive the response message from the transmit end, and receiving performed by using the primary radio consumes a larger amount of electricity. Therefore, to save an amount of electricity, the receive end may disable the primary radio after sending the first broadband signal, and receive, by using the secondary radio, a narrowband signal that is sent by the transmit end and that carries the response message, namely, the response narrowband signal. The receive end may enable the primary radio again after receiving the response narrowband signal.

In one embodiment, before the receiving, by the transmit end, a first broadband signal sent by the receive end based on the feature narrowband signal, the method may further include: sending, by the transmit end, third indication information to the receive end, where the third indication information includes identification information of the receive end, and the third indication information is used by the receive end to determine to enable the primary radio; and the receiving, by the transmit end, a first broadband signal sent by the receive end based on the feature narrowband signal includes: receiving, by the transmit end, the first broadband signal sent by the receive end based on the feature narrowband signal and the identification information of the receive end.

In this embodiment of this application, a group of receive ends that include the receive end may be woken up by using a same feature narrowband signal. When the transmit end needs to send a multicast message to the group of receive ends, the transmit end may wake up the receive ends by using the feature narrowband signal. However, when there is to-be-received downlink data for only one receive end in the group of receive ends, both a receive end that the transmit end is intended to wake up and for which there is data and another STA in the group are woken up. To avoid this case, the transmit end may send the third indication information to the receive end after sending the feature narrowband signal, to further indicate, by using the third indication information, the receive end that needs to be woken up. In this case, the receive end disables the primary radio when the receive end detects that the third indication information does not include the identification information of the receive end, so that power consumption can be reduced. However, a state in which the primary radio is enabled is kept when the receive end detects that the third indication information includes the identification information of the receive end.

In one embodiment, the first instruction information further includes time information, and the time information is used to indicate a moment at which the transmit end sends data; and the method may further include: sending, by the transmit end, the data to the receive end at the moment at which the transmit end sends the data.

The receive end enables the primary radio at the moment at which the transmit end sends the data, to receive the data sent by the transmit end, and does not maintain a state in which continuous listening is performed by using the primary radio, so that power consumption can be reduced.

In one embodiment, when the third indication information includes the identification information of the receive end, the third indication information may further include a PPDU format used when the receive end sends the first broadband signal to the transmit end. The PPDU format includes the modulation and coding scheme of the first broadband signal, and/or time information of sending the first broadband signal by the transmit end.

According to a third aspect, a data transmission method is provided, and the method includes: regularly enabling, by a receive end, primary radio; receiving, by the receive end by using the primary radio, a first broadband signal sent by a transmit end; and sending, by the receive end, a second broadband signal to the transmit end by using the primary radio, where the second broadband signal is used to notify that the receive end successfully receives the first broadband signal.

According to the data transmission method in this embodiment of this application, the transmit end may determine, by using feedback (for example, the second broadband signal) from the receive end, that the receive end has enabled the primary radio. In this case, the transmit end may send data to the receive end after ensuring that the receive end enables the primary radio, so that downlink transmission reliability of the transmit end can be ensured.

In one embodiment, the method may further include: receiving, by the receive end by using the primary radio, a response message sent by the transmit end, where the response message is used to notify that the transmit end successfully receives the second broadband signal.

According to a fourth aspect, a data transmission method is provided, and the method includes: sending, by a transmit end, a first broadband signal to a receive end; receiving, by the transmit end, a second broadband signal sent by the receive end, where the second broadband signal is used to notify that the receive end successfully receives the first broadband signal.

According to the data transmission method in this embodiment of this application, the transmit end may determine, by using feedback (for example, the second broadband signal) from the receive end, that the receive end has enabled the primary radio. In this case, the transmit end may send data to the receive end after ensuring that the receive end enables the primary radio, so that downlink transmission reliability of the transmit end can be ensured.

In one embodiment, the method may further include: sending, by the transmit end, a response message to the receive end, where the response message is used to notify that the transmit end successfully receives the second broadband signal.

According to a fifth aspect, a data transmission method is provided, and the method includes: receiving, by a receive end by using secondary radio, a feature narrowband signal sent by a transmit end, where the feature narrowband signal carries time information, and the time information is used to indicate a moment at which the transmit end sends a first broadband signal; enabling, by the receive end, primary radio based on the feature narrowband signal, where a receiving bandwidth of the secondary radio is less than a receiving bandwidth and a sending bandwidth of the primary radio; and receiving, by the receive end by using the primary radio, the first broadband signal sent by the transmit end at the moment at which the transmit end sends the first broadband signal.

When the transmit end needs to send data to the receive end, the transmit end may first send the feature narrowband signal to the receive end to trigger the receive end to enable the primary radio. In addition, the transmit end may further add the time information to the feature narrowband signal, so that the receive end learns of a moment at which the transmit end sends the data. The receive end may disable the primary radio before the moment at which the transmit end sends the data. The receive end may enable the primary radio again at the moment at which the transmit end sends the data, to receive the data sent by the transmit end. In this way, power consumption of the receive end can be reduced, and standby duration can be extended.

In one embodiment, the method may further include: sending, by a receive end to a transmit end by using primary radio, a second broadband signal that responds to the first broadband signal, where the second broadband signal is used to notify that the receive end successfully receives the first broadband signal.

According to a sixth aspect, a data transmission method is provided, and the method includes: sending, by a transmit end, a feature narrowband signal to a receive end, where the feature narrowband signal carries time information, and the time information is used to indicate a moment at which the transmit end sends a first broadband signal; and sending, by the transmit end, the first broadband signal to the receive end at the moment at which the transmit end sends the first broadband signal.

Before the transmit end needs to send data to the receive end, the transmit end may first send the feature narrowband signal to the receive end to trigger the receive end to enable the primary radio. In addition, the transmit end may further add the time information to the feature narrowband signal, so that the receive end learns of a moment at which the transmit end sends the data. The receive end may disable the primary radio before the moment at which the transmit end sends the data. The receive end may enable the primary radio again at the moment at which the transmit end sends the data, to receive the data sent by the transmit end. In this way, power consumption of the receive end can be reduced, and standby duration can be extended.

In one embodiment, the method may further include: receiving, by the transmit end, a second broadband signal sent by the receive end to respond to the first broadband signal, where the second broadband signal is used to notify that the receive end successfully receives the first broadband signal.

According to a seventh aspect, a data transmission apparatus is provided, configured to perform the method in any one of the first aspect or the possible implementations of the first aspect. In one embodiment, the apparatus includes units configured to perform the method in any one of the first aspect or the possible implementations of the first aspect.

According to an eighth aspect, a data transmission apparatus is provided, configured to perform the method in any one of the second aspect or the possible implementations of the second aspect. In one embodiment, the apparatus includes units configured to perform the method in any one of the second aspect or the possible implementations of the second aspect.

According to a ninth aspect, a data transmission apparatus is provided, configured to perform the method in any one of the third aspect or the possible implementations of the third aspect. In one embodiment, the apparatus includes units configured to perform the method in any one of the third aspect or the possible implementations of the third aspect.

According to a tenth aspect, a data transmission apparatus is provided, configured to perform the method in any one of the fourth aspect or the possible implementations of the fourth aspect. In one embodiment, the apparatus includes units configured to perform the method in any one of the fourth aspect or the possible implementations of the fourth aspect.

According to an eleventh aspect, a data transmission apparatus is provided, configured to perform the method in any one of the fifth aspect or the possible implementations of the fifth aspect. In one embodiment, the apparatus includes units configured to perform the method in any one of the fifth aspect or the possible implementations of the fifth aspect.

According to a twelfth aspect, a data transmission apparatus is provided, configured to perform the method in any one of the sixth aspect or the possible implementations of the sixth aspect. In one embodiment, the apparatus includes units configured to perform the method in any one of the sixth aspect or the possible implementations of the sixth aspect.

According to a thirteenth aspect, a data transmission apparatus is provided, and the apparatus includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. In addition, when the processor executes the instruction stored in the memory, the processor performs the method in any one of the first aspect or the possible implementations of the first aspect.

According to a fourteenth aspect, a data transmission apparatus is provided, and the apparatus includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. In addition, when the processor executes the instruction stored in the memory, the processor performs the method in any one of the second aspect or the possible implementations of the second aspect.

According to a fifteenth aspect, a data transmission apparatus is provided, and the apparatus includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. In addition, when the processor executes the instruction stored in the memory, the processor performs the method in any one of the third aspect or the possible implementations of the third aspect.

According to a sixteenth aspect, a data transmission apparatus is provided, and the apparatus includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. In addition, when the processor executes the instruction stored in the memory, the processor performs the method in any one of the fourth aspect or the possible implementations of the fourth aspect.

According to a seventeenth aspect, a data transmission apparatus is provided, and the apparatus includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. In addition, when the processor executes the instruction stored in the memory, the processor performs the method in any one of the fifth aspect or the possible implementations of the fifth aspect.

According to an eighteenth aspect, a data transmission apparatus is provided, and the apparatus includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. In addition, when the processor executes the instruction stored in the memory, the processor performs the method in any one of the sixth aspect or the possible implementations of the sixth aspect.

According to a nineteenth aspect, a computer readable medium is provided, configured to store a computer program. The computer program includes an instruction used to perform the method in any one of the first aspect or the possible implementations of the first aspect.

According to a twentieth aspect, a computer readable medium is provided, configured to store a computer program. The computer program includes an instruction used to perform the method in any one of the second aspect or the possible implementations of the second aspect.

According to a twenty-first aspect, a computer readable medium is provided, configured to store a computer program. The computer program includes an instruction used to perform the method in any one of the third aspect or the possible implementations of the third aspect.

According to a twenty-second aspect, a computer readable medium is provided, configured to store a computer program. The computer program includes an instruction used to perform the method in any one of the fourth aspect or the possible implementations of the fourth aspect.

According to a twenty-third aspect, a computer readable medium is provided, configured to store a computer program. The computer program includes an instruction used to perform the method in any one of the fifth aspect or the possible implementations of the fifth aspect.

According to a twenty-fourth aspect, a computer readable medium is provided, configured to store a computer program. The computer program includes an instruction used to perform the method in any one of the sixth aspect or the possible implementations of the sixth aspect.

DESCRIPTION OF EMBODIMENTS

Figure 1:
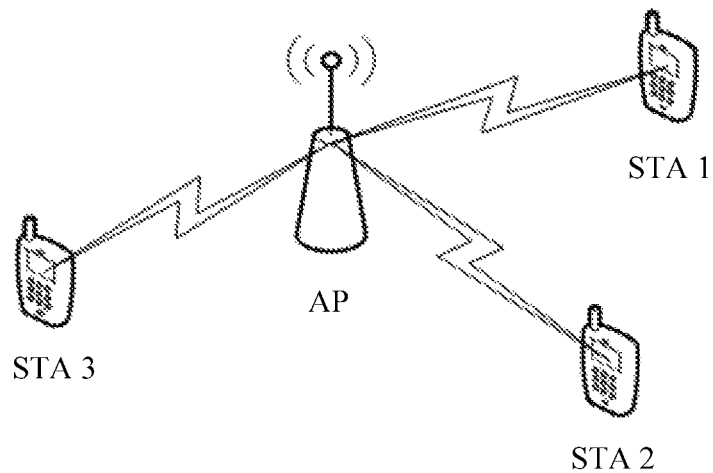
FIG. 1 is a schematic block diagram of a system according to an embodiment of this application.

The following describes in detail the technical solutions in the embodiments of this application with reference to the accompanying drawings in the embodiments of this application.

An embodiment of this application provides a data transmission method. The method may be performed by a wake-up device (or referred to as a transmit end) and/or a woken-up device (or referred to as a receive end). The woken-up device has two sets of radio: primary radio and secondary radio (or referred to as wake-up radio). Alternatively, the woken-up device has one set of radio that may operate in both a primary radio mode and a secondary radio mode. A receiving bandwidth of the secondary radio is less than a receiving bandwidth and a sending bandwidth of the primary radio. Further, a signal receiving frequency of the secondary radio is less than a signal receiving frequency and a signal sending frequency of the primary radio. In one embodiment, the secondary radio has a receiving capability, and may receive a narrowband signal sent by the wake-up device. The primary radio has both a sending capability and a receiving capability, and may receive or send a broadband signal. The woken-up device supports a wake-up receiver (wake-up receiver, WUR) function. In other words, the woken-up device supports a wake-up radio (wake-up radio, WUR) function. The woken-up device that supports the WUR function is in a sleep state when no data is transmitted. The wake-up device may first send a wake-up signal when the wake-up device needs to send downlink data to the woken-up device; and the primary radio is enabled when the secondary radio of the woken-up device receives the wake-up signal. After being enabled, the primary radio of the woken-up device may receive the downlink data sent by the wake-up device. Power consumption of the secondary radio is less than that of the primary radio during operation. Therefore, the woken-up device may listen to the wake-up signal by using the secondary radio, and the wake-up signal is used to wake up the primary radio in a sleep state, to reduce power consumption.

The wake-up signal may be referred to as a feature narrowband signal. The feature narrowband signal may be a narrowband signal that is pre-agreed on by the woken-up device and the wake-up device and that has specific feature information. For example, the feature information may include at least one piece of the following information about the signal: a sending frequency, a sending waveform, a modulation and coding scheme, spread spectrum information, a quantity of sending repetition times, a sending time, a feature identification (identification, ID), and the like. In other words, the feature narrowband signal may be a signal that has a specific frequency or a specific waveform, the feature narrowband signal may be a signal that uses a specific modulation and coding scheme, the feature narrowband signal may be a signal sent at a specific time, or the feature narrowband signal may be a signal that is repeatedly sent a specific quantity of times, and on the like. A specific form of the feature narrowband signal is not limited in this embodiment of this application. When receiving the feature narrowband signal, the woken-up device identifies information such as a frequency, a waveform, and a modulation and coding scheme of the feature narrowband signal. When determining that one or more pieces of the information match the feature information, the woken-up device may wake up the primary radio to receive the downlink data. The feature ID herein may be used to distinguish between woken-up devices or woken-up device groups, or the feature ID may be used to identify whether the feature narrowband signal is a broadcast signal. The woken-up device and the wake-up device may add a feature indication of the feature narrowband signal to an association request, an association reply, or a message that is last received or sent by the woken-up device before the woken-up device enters the sleep state or a sleep negotiation message, to indicate the pre-agreed feature information.

This embodiment of this application may be applied to a wireless local area network (wireless local area network, WLAN). Currently, a standard used by the WLAN is the IEEE 802.11 family. The WLAN may include a plurality of basic service sets (basic service set, BSS), a network node in a BSS is a station (Station, STA), and STAs include an access point (access point, AP) and a non-access point station (none-access point station, non-AP STA). Each BSS may include one AP and a plurality of non-AP STAs associated with the AP. In this embodiment of this application, the wake-up device may be an AP, and the woken-up device may be a STA. Alternatively, the wake-up device may be a STA, and the woken-up device may be an AP.

The AP may also be referred to as a wireless access point, a hotspot, or the like. The AP is an access point by using which a mobile user accesses a wired network, and is mainly deployed in a house, inside a building, and inside a park with a typical coverage radius of tens to hundreds of meters, and certainly may also be deployed outdoors. The AP is equivalent to a bridge that connects the wired network and a wireless network. A main function of the AP is to connect various wireless network clients and connect the wireless network to Ethernet. In one embodiment, the AP may be a terminal device or a network device having a Wireless Fidelity (Wireless Fidelity, Wi-Fi) chip. In one embodiment, the AP may be a device that supports the 802.11ax standard. Further, In one embodiment, the AP may be a device that supports a plurality of WLAN standards such as 802.11ac, 802.11n, 802.11g, 802.11b, 802.11a, and a subsequent version.

The non-AP STA may be a wireless communications chip, a wireless sensor, or a wireless communications terminal, for example, may be a mobile phone that supports a Wi-Fi communication function, a tablet computer that supports a Wi-Fi communication function, a set top box that supports a Wi-Fi communication function, a smart TV that supports a Wi-Fi communication function, an intelligent wearable device that supports a Wi-Fi communication function, an in-vehicle communications device that supports a Wi-Fi communication function, and a computer that supports a Wi-Fi communication function. In one embodiment, the station may support the 802.11ax standard. Further, In one embodiment, the station supports a plurality of WLAN standards such as 802.11ac, 802.11n, 802.11g, 802.11b, 802.11a, and a subsequent version.

FIG. 1 is a schematic diagram of a system in a typical WLAN deployment scenario. The system includes one AP and three STAs. The AP separately communicates with a STA 1, a STA 2, and a STA 3.

In an 802.11ax WLAN system into which an OFDMA technology is introduced, the AP may perform uplink and downlink transmission with different STAs on different time-frequency resources. The AP may use different modes to perform both uplink and downlink transmission, for example, an OFDMA single user multiple-input multiple-output (single user multiple-input multiple-output, SU-MIMO) mode or OFDMA multi-user multiple-input multiple-output (multi-user multiple-input multiple-output, MU-MIMO) mode.

The AP may simultaneously send downlink PPDUs to a plurality of stations or a plurality of station groups. The plurality of stations herein may be stations in the SU-MIMO mode, and the plurality of station groups may be station groups in the MU-MIMO mode.

It should be noted that in a future possible WLAN standard, a name of the standard, a name of a field, or the like may be replaced with any other name, and this shall not be construed as a limitation to the protection scope of this application. Descriptions of the PPDU are also applicable to all embodiments.

The following describes a data transmission method in an embodiment of this application by using an AP as a wake-up device and a STA as a woken-up device.

In this embodiment of this application, the STA may support two running states. One running state is that the STA is always in a WUR mode, and the other running state is that the STA may be in a non-WUR mode. In the WUR mode, the AP needs to first send a feature narrowband signal to wake up the STA in any downlink transmission initiated by the AP. The STA may always or regularly listen to a narrowband signal until receiving the feature narrowband signal. In the non-WUR mode, the STA may always or regularly listen to a broadband signal. The AP may directly send a downlink transmission packet to the STA or regularly send a downlink transmission packet to the STA, and does not need to wake up the STA by using a feature narrowband signal.

Figure 2:
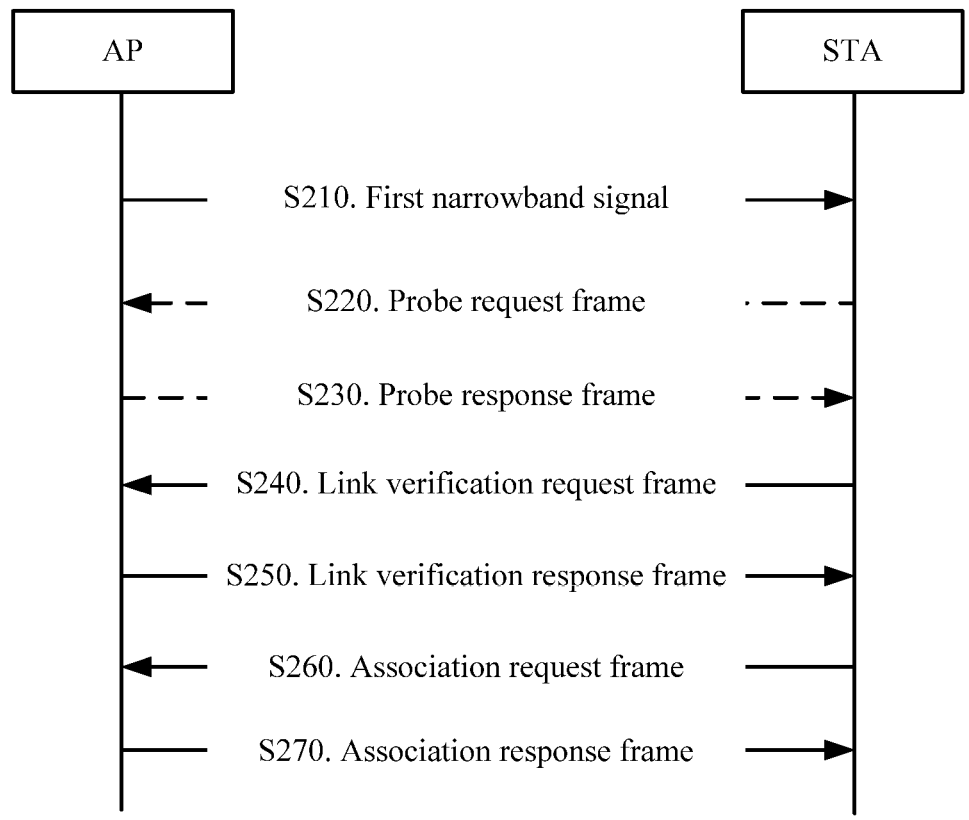
FIG. 2 is a schematic flowchart of a device association method according to an embodiment of this application.

For a STA that may be in the WUR mode, a process in which the STA is associated with an AP may depend on a narrowband signal. The following describes a device association method in an embodiment of this application with reference to FIG. 2.

Operation S210. A STA receives, by using secondary radio, a first narrowband signal sent by an AP.

The STA in a sleep state may enable primary radio after receiving the first narrowband signal, to be associated with the AP.

Operation S220. The STA sends a probe request frame to the AP, to request parameter information of the AP.

Operation S230. The STA receives a probe response frame sent by the AP. The probe response frame may include the parameter information of the AP, for example, configuration information of the AP.

Operation S240. The STA sends a link verification request frame to the AP.

To ensure security of a radio link, the AP needs to complete authentication on the STA in a wireless user access process, and a subsequent association phase can be entered only after the STA is authenticated.

Operation S250. The AP sends a link verification response frame to the STA.

The AP may send a link verification response frame to the STA after link authentication performed by the AP on the STA succeeds.

Operation S260. The STA sends an association request frame to the AP.

The STA needs to establish an association with a specific AP if the STA needs to access a wireless network. The STA may send the association request frame to the AP after link authentication performed by the AP on the STA succeeds.

Operation S270. The AP sends an association response frame to the STA.

After receiving the association request frame sent by the STA, the AP may detect capability information carried in the association request frame, to determine that the STA has a capability of accessing a network. Then the AP returns the association response frame to the STA, to notify the STA that link association succeeds.

For a specific operation in the process in which the STA is associated with the AP, refer to the prior art. For brevity, details are not described herein.

In this embodiment of this application, the STA may add indication information to the probe request frame. The indication information may be used to indicate that the STA supports a WUR capability. In this case, after receiving the probe request frame, the AP may determine that the STA supports the WUR capability, and therefore reply a probe response to the STA. In one embodiment, the AP may not reply a probe response to the STA if the AP does not support the WUR capability. In this manner, the AP may be selectively associated with a STA that supports the WUR capability, so that a STA that needs to use the WUR capability is associated with only an AP that has a wake-up capability.

In one embodiment, the first narrowband signal may carry a service set identifier (service set identifier, SSID) or a basic service set identifier (basic service set identifier, BSSID) of the AP.

The STA may add the BSSID and/or the SSID of the AP to the probe request frame when the first narrowband signal carries the service set identifier SSID or the BSSID of the AP. In this case, the STA that needs to use the WUR capability may be associated with a specified AP that has a narrowband sending capability (the wake-up capability). In addition, the STA may directly perform operation S240 after operation S210. For example, when the STA has known the parameter information of the AP, the STA may not need to request the parameter information by using the probe request frame.

The STA may directly perform operation S260 after operation S210. For example, when the STA receives the SSID or the BSSID included in the first narrowband signal, the STA may determine that the STA was once associated with an original AP in an extended service set (extended service set, ESS) to which the AP belongs. In this case, the STA may send the association request frame to directly request to be associated with the AP again.

In this embodiment of this application, In one embodiment, because the AP cannot determine whether the STA is in a wake-up state, the AP may first send a feature narrowband signal to the STA before the AP returns the probe response frame in S230, and the AP returns the probe response frame for the probe request frame to the STA after waking up the STA by using the feature narrowband signal.

In one embodiment, the STA may send the probe request frame or another frame by using the primary radio, and add a wake-up holding time to the frame. The AP directly returns the probe response frame for the probe request frame to the STA in the wake-up holding time by using the primary radio.

In this embodiment of this application, the STA may enter the sleep state after sending the probe request frame in S220. In this case, the STA disables the primary radio. Herein, after receiving the feature narrowband signal sent by the AP, the STA wakes up the primary radio when finding that feature information of the feature narrowband signal is the same as agreed feature information for waking up the STA. Alternatively, after receiving the feature narrowband signal sent by the AP, the STA wakes up the primary radio when detecting that the feature narrowband signal indicates that a downlink data packet subsequently sent by the AP is of a specified frame type, for example, a probe response frame. Alternatively, after receiving the feature narrowband signal sent by the AP, the STA wakes up the primary radio when detecting that an ID carried in the feature narrowband signal is an ID carried in the probe request frame previously sent by the STA.

In one embodiment of this application, the STA may add indication information to the association request frame. The indication information may be used to indicate that the STA supports a WUR capability.

In one embodiment of this application, the STA may add the feature information of the feature narrowband signal to the association request frame; or the AP may add the feature information of the feature narrowband signal to the association response frame. Alternatively, the STA may add the feature information of the feature narrowband signal to a message that is last received or sent before the STA enters the sleep state, or to a sleep negotiation message exchanged between the STA and the AP.

According to the device association method in this embodiment of this application, the STA keeps the sleep state and enables the primary radio after receiving a narrowband signal (for example, the first narrowband signal), to be associated with the AP, so that a problem that the STA listens to, in the wake-up state, a beacon frame sent by the AP or the STA indiscriminately sends the probe request frame to the AP can be avoided, and power consumption can be reduced.

Figure 3:
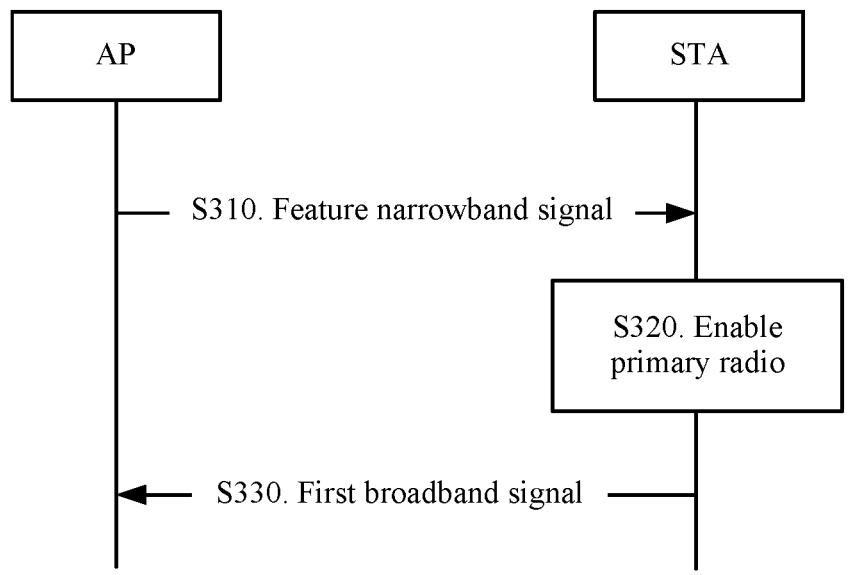
FIG. 3 is a schematic flowchart of a data transmission method according to an embodiment of this application.

After a STA supporting a WUR capability is associated with an AP, the AP may wake up primary radio of the STA by using a feature narrowband signal, and transmit data to the STA. FIG. 3 is a schematic flowchart of a data transmission method 300 according to an embodiment of this application. In the method 300 shown in FIG. 3, an AP may wake up primary radio of a STA by using a feature narrowband signal.

It should be noted that in the following description, a state in which the STA disables the primary radio and enables secondary radio to listen to the feature narrowband signal is referred to as a mode 1, and a state in which the STA enables the primary radio is referred to as a mode 0.

It should be understood that in this embodiment of this application, numbers "first" and "second" are merely used to distinguish between different objects, for example, to distinguish between narrowband signals or broadband signals sent at different times, and shall not constitute any limitation on the protection scope of this embodiment of this application.

Operation S310. An AP sends a feature narrowband signal to a STA.

In one embodiment, the AP may enable primary radio of the STA (or wake up the STA) by using the feature narrowband signal. To be specific, the AP may trigger, by using the feature narrowband signal, the STA to enter the mode 0 from the mode 1.

It should be noted that the AP may alternatively send a broadband signal with feature information to the STA. Because the secondary radio of the STA has a relatively narrow receiving bandwidth, the STA can receive only a part of the broadband signal. The part of the broadband signal received by the STA may be referred to as a feature narrowband signal. In one embodiment, the AP may add a plurality of feature narrowband signals to different frequency bands of the broadband signal, to wake up a plurality of STAs.

Operation S320. The STA enables primary radio when receiving, by using secondary radio, the feature narrowband signal sent by the AP.

In one embodiment, when receiving the feature narrowband signal sent by the AP, the STA identifies feature information of the feature narrowband signal, for example, a frequency, a waveform, or a modulation and coding scheme of the feature narrowband signal. When determining that the frequency, the waveform, the modulation and coding scheme, or the like of the feature narrowband signal matches the feature information, the STA enables the primary radio, and enters the mode 0.

Operation S330. The STA sends a first broadband signal to the AP by using the primary radio.

It should be understood that the first broadband signal is a type of broadband signal.

If the STA does not successfully receive the feature narrowband signal in S320, the STA is not switched to the mode 0, and consequently, the STA cannot successfully receive data subsequently sent by the AP. To avoid a case in which the AP indiscriminately sends data, the AP needs to send data when learning that the STA enters the mode 0. In one embodiment, after enabling the primary radio, the STA may send the first broadband signal to the AP by using the primary radio, to feed back to the AP that the STA has enabled the primary radio. In this case, after receiving the first broadband signal, the AP may determine that the STA has enabled the primary radio, and may receive data. Subsequently, the AP may send data to the STA. However, if the AP does not receive the first broadband signal within a period of time after sending the feature narrowband signal, the AP may resend the feature narrowband signal to wake up the STA.

According to the data transmission method in this embodiment of this application, the AP may determine, by using feedback (for example, the first broadband signal) from the STA, that the STA has enabled the primary radio. In this case, the AP may send the data to the STA after ensuring that the STA enables the primary radio, so that downlink transmission reliability of the AP can be improved.

In this embodiment of this application, the AP may cache low-priority or delay-tolerable data, and does not need to wake up the STA by using the secondary radio. The AP may notify the STA of downlink data when the STA enables the primary radio, for example, the STA enables the primary radio for uplink transmission, to reduce a quantity of times of waking up the STA, and reduce power consumption of the STA. For high-priority or delay-sensitive data, the AP may wake up the STA by using the feature narrowband signal, to reduce a receiving delay of the STA. The AP and the STA may negotiate about a classification of the low-priority or delay-tolerable data and the high-priority or delay-sensitive data.

It should be understood that, for a feature narrowband signal mentioned below, refer to the foregoing descriptions. For brevity, details are not described below again.

Figure 4:
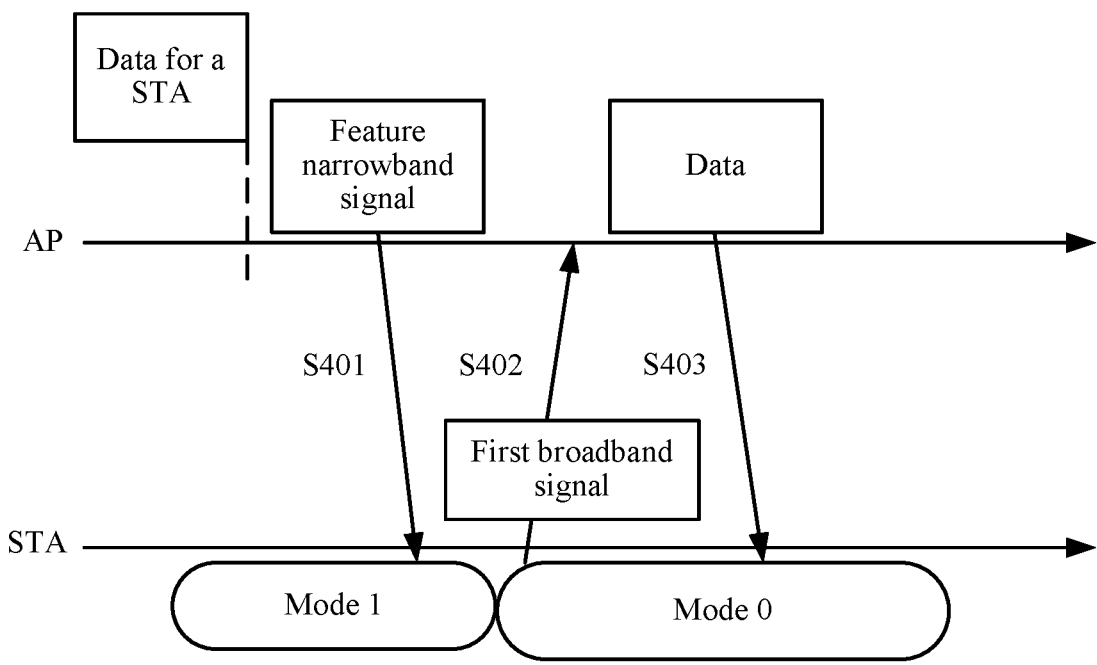
FIG. 4 is a schematic flowchart of a data transmission method according to an embodiment of this application.

FIG. 4 is a schematic flowchart of a data transmission method according to an embodiment of this application.

As shown in FIG. 4, a STA is in a mode 1. When an AP has data for the STA, the AP may perform S401, in other words, may send a feature narrowband signal to the STA. The STA enters a mode 0 after receiving the feature narrowband signal sent by the AP. After entering the mode 0, the STA may perform S402, in other words, may send a first broadband signal to the AP, so that the AP may determine that the STA has entered the mode 0. After receiving the first broadband signal, the AP may determine that the STA has entered the mode 0. Then the AP may perform S403, in other words, may send the data (namely, the data for the STA) to the STA.

Figure 5:
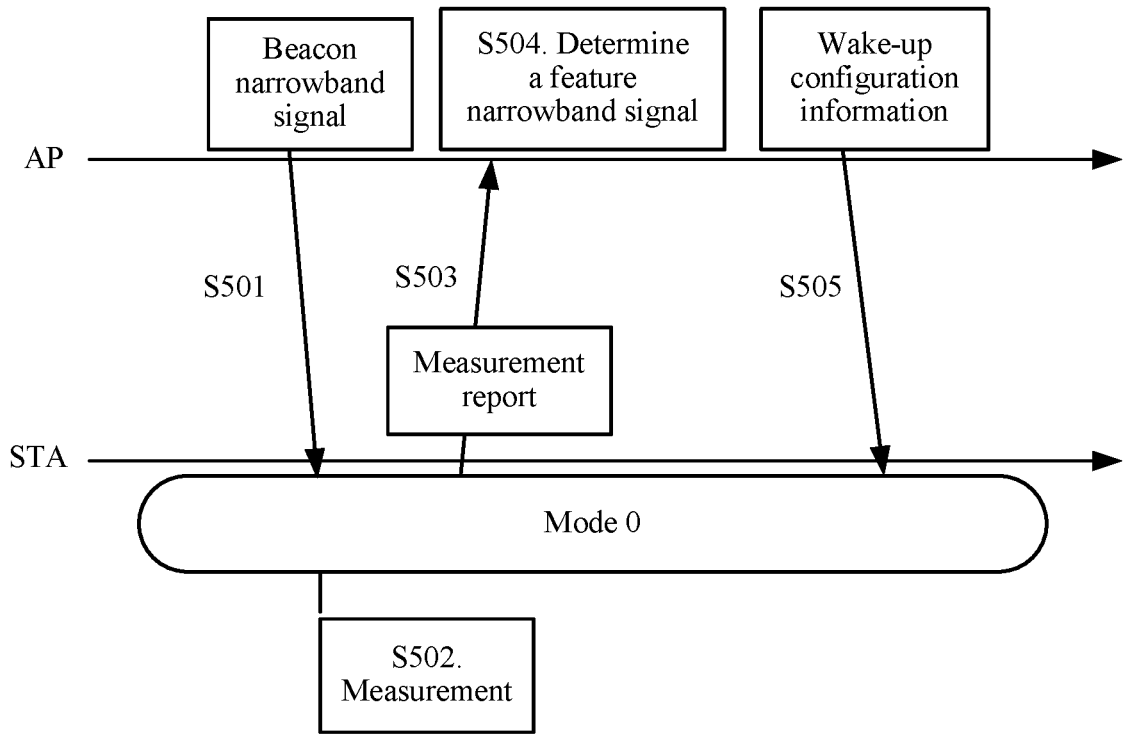
FIG. 5 is a schematic flowchart of a data transmission method according to another embodiment of this application.

As described above, the AP may enable primary radio of the STA after sending the feature narrowband signal to the STA. Before this, the AP needs to first determine the feature narrowband signal. In this embodiment of this application, the AP may determine the feature narrowband signal in a manner shown in FIG. 5, and notify the STA of feature information of the feature narrowband signal. Therefore, the STA may enable the primary radio after receiving the feature narrowband signal.

Operation S501. An AP may first send a beacon narrowband signal to a STA.

In consideration of mobility of the STA and impact of another STA near the STA on the STA, the AP may periodically or aperiodically send the beacon narrowband signal to the AP.

Operation S502. After receiving the beacon narrowband signal, the STA may measure the beacon narrowband signal, to obtain a signal measurement result and/or a channel measurement result.

For example, the STA may measure the beacon narrowband signal, to obtain a signal measurement result such as signal strength or signal quality. In addition, the STA may further obtain a channel measurement result such as a channel quality indicator (channel quality indicator, CQI) or channel state information (channel state information, CSI).

Operation S503. The STA sends a measurement report to the AP.

In one embodiment, after obtaining the signal measurement result and/or the channel measurement result, the STA may send the measurement report to the AP. The measurement report may be used to indicate the signal measurement result and/or the channel measurement result.

Operation S504. The AP may determine a feature narrowband signal based on the measurement report.

For example, the AP may learn of, based on the measurement report, information such as a distance between the AP and the STA, narrowband channel quality, and narrowband signal received strength of the STA. To accurately wake up the STA, the AP may determine, based on the signal measurement result and/or the channel measurement result, information such as a frequency and a waveform of a signal that is used to wake up the STA. The information is determined, so that the feature information of the feature narrowband signal is determined, and in addition, the feature narrowband signal is determined.

Operation S505. The AP sends wake-up configuration information to the STA.

In one embodiment, the wake-up configuration information may be used to indicate the feature information of the feature narrowband signal. The feature information may be used to instruct the STA to enable the primary radio when receiving the feature narrowband signal. In other words, the AP may send the wake-up configuration information to the STA, to agree with the STA on the feature information of the feature narrowband signal. Afterwards, the STA and the AP may interact in the method shown in FIG. 3 or FIG. 4. For brevity, details are not described herein again.

In this embodiment of this application, the beacon narrowband signal in S501 may include action instruction information. The action instruction information may be used to instruct the STA to enable the primary radio or not to enable the primary radio after receiving the beacon narrowband signal. The STA wakes up the primary radio in S502 if the action instruction information instructs the STA to enable the primary radio after receiving the beacon narrowband signal. The STA may not wake up the primary radio in S502 if the action instruction information instructs the STA not to enable the primary radio after receiving the beacon narrowband signal.

According to the data transmission method in this embodiment of this application, the STA may periodically or aperiodically measure the beacon narrowband signal, and report the measurement report to the AP, so that the AP may determine the feature narrowband signal based on the measurement report, to ensure that the AP can accurately wake up the STA.

In the foregoing embodiment, after determining the feature narrowband signal, the AP may further send the beacon narrowband signal to the STA in a preset time, to determine whether the STA is within a narrowband coverage area of the AP. In one embodiment, the AP may determine, depending on whether the STA receives a narrowband signal periodically sent by the AP, whether the STA is within a narrowband signal coverage area of the AP. The STA may enable the primary radio when the STA does not receive, by using secondary radio and in a preset time or before a preset time expires, the beacon narrowband signal sent by the AP. Then the STA sends fourth indication information to the AP by using the primary radio, and the fourth indication information is used to indicate that the STA does not receive the beacon narrowband signal. The preset time may be an agreed time in a protocol or an agreed multiple of an agreed time in a protocol.

In one embodiment, the AP may send the narrowband signal to the STA in the preset time, and the narrowband signal may be any narrowband signal, for example, a beacon narrowband signal. If the STA does not receive, in a present time, the beacon narrowband signal sent by the AP, the STA enables the primary radio, and sends the fourth indication information to the AP. After receiving the fourth indication information, the AP may learn that the STA does not receive the beacon narrowband signal in the preset time or before the preset time expires, and may further determine that the STA is not within the narrowband signal coverage area of the AP. The AP may record the information that the STA is not within the narrowband signal coverage area of the AP. When the AP and the STA transmit information, the AP no longer uses the feature narrowband signal to wake up the STA.

Further, after the STA enables the primary radio and before the STA sends the fourth indication information to the AP by using the primary radio, the STA may alternatively wait to receive a third broadband signal sent by the AP. The STA may send the fourth indication information to the AP when the STA receives the third broadband signal sent by the AP. In this case, the fourth indication information is further used to indicate that the STA successfully receives the third broadband signal sent by the AP. In this case, when the STA cannot receive a narrowband signal, the AP can communicate with the STA by using a broadband signal. For example, the AP may periodically send a beacon frame to the STA, and the beacon frame may indicate that the AP has data to be sent to the STA. The STA periodically enables the primary radio to receive the beacon frame. When determining that there is data for the STA in the beacon frame, the STA remains awake to receive the data sent by the AP.

In this embodiment of this application, the feature narrowband signal may further carry first instruction information or second instruction information, to indicate a specific operation of the STA after the STA receives the feature narrowband signal.

The first instruction information may be used to instruct the STA to send a first broadband signal to the AP after receiving the feature narrowband signal. In this case, the STA may send, based on the first instruction information, the first broadband signal to the AP by using the primary radio in S330. In other words, after receiving the feature narrowband signal, the STA may send the first broadband signal to the AP, to notify the AP that the STA has enabled the primary radio.

The second instruction information may be used to instruct the STA to send a first broadband signal to the AP after receiving a second broadband signal sent by the AP. In this case, before S330, a method 300 may further include: receiving, by the STA, the second broadband signal sent by the AP, where the second broadband signal may carry query information and transmission indication information. The query information is used by the AP to determine whether the STA has enabled the primary radio, and the transmission indication information is used to indicate a transmission manner of the first broadband signal when the STA sends the first broadband signal to the AP in a state in which the primary radio has been enabled. Therefore, the STA may send, based on the second broadband signal, the first broadband signal to the AP in the transmission manner by using the primary radio in S330. In short, after receiving the feature narrowband signal sent by the AP, the STA sends the first broadband signal to the AP after receiving the second broadband signal sent by the AP, to notify the AP that the STA has enabled the primary radio. In addition, in this case, the first broadband signal is transmitted in a transmission manner required by the AP. The transmission manner described herein may include at least one piece of the following information about the first broadband signal: a sending time, an end time, a sending frequency, a modulation and coding scheme, and the like. For example, the first broadband signal may be sent in a time specified by the AP, or the sending frequency of the first broadband signal may be a sending frequency indicated by the AP.

In one embodiment, the method 300 may further include: disabling, by the STA, the primary radio when the STA does not receive, within a first preset time period after the STA sends the first broadband signal or within a second preset time period after the STA sends the first broadband signal a preset quantity of times, data sent by the AP or a response message sent by the AP to respond to the first broadband signal.

In one embodiment, to ensure a receiving success rate of the AP, the STA may also consecutively send the first broadband signal the preset quantity of times. For example, the STA may consecutively send the first broadband signal three or four times. After sending the first broadband signal or sending the first broadband signal the preset quantity of times, the STA may maintain the state in which the primary radio is enabled, and wait to receive the data or the response message sent by the AP. If the STA does not receive, in a period of time (for example, the first preset time period or the second preset time period), the data or the response message sent by the AP, the STA may disable the primary radio, and enter the mode 1. In this case, power consumption of the STA can be reduced, and standby duration can be extended. The first preset time period and the second preset time period herein may be pre-agreed on by the AP and the STA, for example, may be five seconds or three seconds.

After the STA disables the primary radio, if the AP needs to send data, the AP may wake up the STA again by using the feature narrowband signal. In addition, before disabling the primary radio and entering the mode 1, the STA may notify the AP that the STA is to disable the primary radio. Afterwards, the STA may directly disable the primary radio, and enter the mode 1. Alternatively, after the AP determines that the STA may disable the primary radio, the STA disables the primary radio and enters the mode 1.

In one embodiment, the method 300 may further include: receiving, by the STA, the response message sent by the AP, where the response message is used to notify that the AP successfully receives the first broadband signal.

Figure 6:
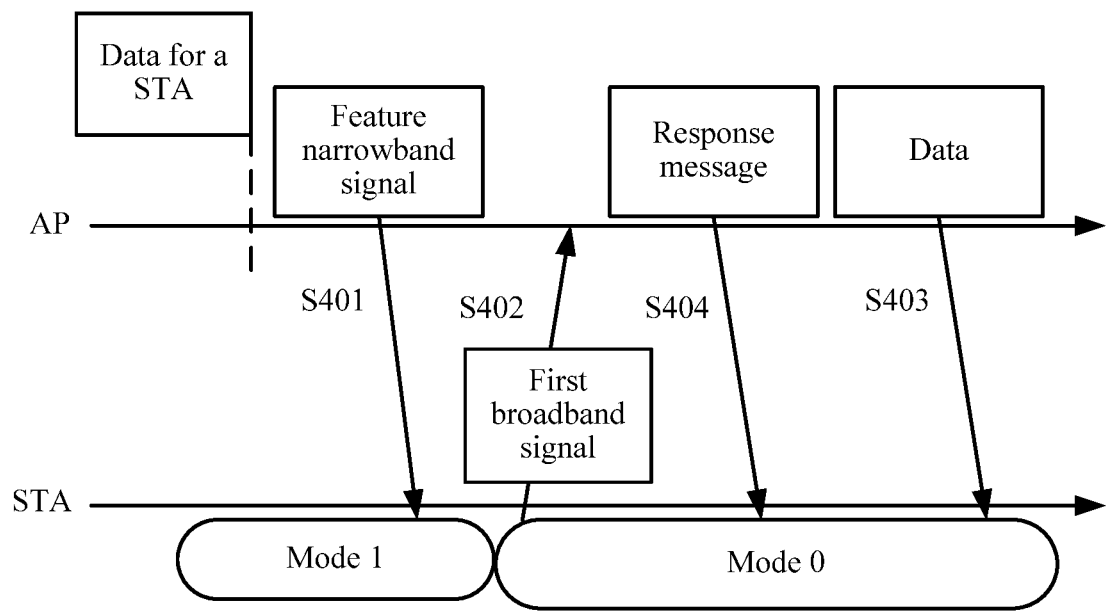
FIG. 6 is a schematic flowchart of a data transmission method according to still another embodiment of this application.

In one embodiment, as shown in FIG. 6, after receiving the first broadband signal sent by the STA in S402, the AP may send, to the STA in S404, the response message that responds to the first broadband signal. After receiving the response message sent by the AP, the STA may learn that the AP has successfully received the first broadband signal. This can avoid a case in which the AP does not successfully receive the first broadband signal, and the STA indiscriminately performs broadband listening in the mode 0, thereby consuming energy. In addition, the AP may simultaneously send data to a plurality of STAs that include the STA. In this case, the AP may separately send the response message to the plurality of STAs, so that the plurality of STAs are in the mode 0, and each of the plurality of STAs can receive the data sent by the AP.

Further, the STA needs to enable the primary radio to receive the response message from the AP, and receiving performed by using the primary radio consumes a larger amount of electricity. Therefore, to save an amount of electricity, the STA may disable the primary radio after sending the first broadband signal, and receive, by using the secondary radio, a narrowband signal that is sent by the AP and that carries the response message. Herein, the narrowband signal that carries the response message may be referred to as a response narrowband signal. The STA may enter the mode 0 after receiving the response narrowband signal.

In the foregoing procedure, the STA may enable a sending function, a receiving function, a corresponding sending module, and a corresponding receiving module of the primary radio in separate operations. In a process in which the STA sends the first broadband signal, the STA uses the primary radio for only sending, and therefore, the STA enables the sending function and the corresponding sending module of the primary radio. The STA enables the receiving function and the corresponding receiving module of the primary radio after receiving the response narrowband signal.

In one embodiment, the method 300 may further include: disabling, by the STA, the primary radio when the STA does not receive, within a third preset time period after the STA receives the response message, the data sent by the AP.

In this embodiment of this application, to avoid consuming energy of the STA when the STA is continuously in the mode 0 after being woken up by the AP, and the AP does not send data, the STA keeps enabling a broadband listening function in an agreed time, namely, the third preset time period, for example, five seconds after receiving the response message. In other words, the STA is in the mode 0. After the agreed time, the STA enters the mode 1 if the STA does not receive the data sent by the AP. The AP needs to resend the feature narrowband signal if the AP needs to send data to the STA.

In this embodiment of this application, a group of STAs that include the STA may be woken up by using a same feature narrowband signal. When the AP needs to send a multicast message to the group of STAs, the AP may wake up the STAs by using the feature narrowband signal. However, when there is to-be-received downlink data for only one STA in the group of STAs, both a STA that the AP is intended to wake up and for which there is data and another STA in the group are woken up. To avoid this case, this application provides an embodiment.

In one embodiment, the AP may send third indication information to the STA after sending the feature narrowband signal, and further indicate, by using the third indication information, the STA that needs to be woken up. In this case, the STA disables the primary radio when the STA detects that the third indication information does not include identification information of the STA, so that power consumption can be reduced. However, the STA enters the mode 0 when the STA detects that the third indication information includes identification information of the STA. In addition, when the third indication information includes the identification information of the STA, the STA may send the first broadband signal to the AP by using the primary radio, to notify the AP that the STA enters the mode 0.

Further, when the third indication information includes the identification information of the STA, the third indication information may further include time information. The time information is used to indicate a moment at which the AP sends data to the STA. In this case, the STA may disable the primary radio after sending the first broadband signal. Then, based on the time information in the third indication information, the STA may enable the primary radio at the moment at which the AP sends the data, to receive the data sent by the AP. By using this method, power consumption of the STA can be reduced.

Further, when the third indication information includes the identification information of the STA, the third indication information may further include a PPDU format used when the STA sends the first broadband signal to the AP, for example, a modulation and coding scheme, or may further include a parameter such as a time at which the STA sends the first broadband signal. This is not limited in this embodiment of this application.

Figure 7:
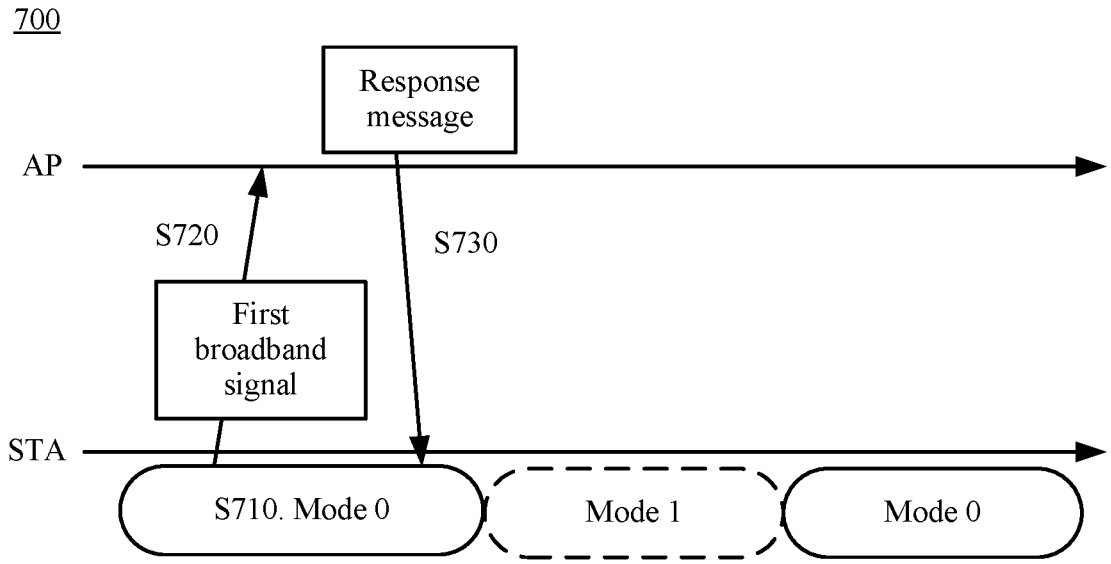
FIG. 7 is a schematic flowchart of a data transmission method according to an embodiment of this application.

FIG. 7 shows a data transmission method 700 according to another embodiment of this application. In the method 700 shown in FIG. 7, the STA may regularly enable primary radio, and may not need to wake up the primary radio by using a feature narrowband signal.

Operation S710. A STA regularly enables primary radio.

It should be understood that an AP and the STA may negotiate in advance about a time at which the STA enables the primary radio. However, that the STA regularly enables the primary radio means that the STA may periodically or aperiodically enable the primary radio.

Operation S720. The STA sends a first broadband signal to an AP by using the primary radio, where the first broadband signal is used to notify that the STA has enabled the primary radio.

In one embodiment, the STA may send the first broadband signal to the AP after regularly enabling the primary radio. After receiving the first broadband signal sent by the STA, the AP may learn that the STA has enabled the primary radio. Afterwards, the AP may transmit data to the STA.

According to the data transmission method in this embodiment of this application, the AP may determine, by using feedback (for example, the first broadband signal) from the STA, that the STA has enabled the primary radio. In this case, the AP may send the data to the STA after ensuring that the STA enables the primary radio, so that downlink transmission reliability of the AP can be ensured.

In one embodiment, the method 700 may further include the following operation: S730. The STA receives, by using the primary radio, a response message sent by the AP, where the response message is used to notify that the AP successfully receives the first broadband signal.

In one embodiment, after receiving the first broadband signal sent by the STA, the AP may send, to the STA, the response message that responds to the first broadband signal. After receiving the response message sent by the AP, the STA may learn that the AP has successfully received the first broadband signal. This can avoid a case in which the AP does not successfully receive the first broadband signal, and the STA indiscriminately performs broadband listening in a mode 0, thereby consuming energy. In addition, the AP may simultaneously send data to a plurality of STAs that include the STA. In this case, the AP may separately send the response message to the plurality of STAs, so that the plurality of STAs are in the mode 0, and each of the plurality of STAs can receive the data sent by the AP.

In one embodiment, that the STA regularly enables the primary radio includes: regularly enabling, by the STA, the primary radio when the STA does not receive, by using secondary radio, a feature narrowband signal sent by the AP.

In this embodiment of this application, the STA may regularly enable the primary radio, or may simultaneously wake up the primary radio by using the feature narrowband signal. The STA regularly enables the primary radio when the STA does not receive, by using the secondary radio, the feature narrowband signal sent by the AP. Herein, the STA does not receive the feature narrowband signal sent by the AP, and the reason may be that the STA has moved out of a narrowband coverage area, or the AP does not need to transmit data to the STA. However, in either case, the STA may regularly enable the primary radio and enter the mode 0. In addition, the STA may feed back the first broadband signal to the AP, so that the AP determines that the STA is within a broadband coverage area, and the AP can transmit data.

When the STA does not receive, by using the secondary radio, the feature narrowband signal sent by the AP, the STA may add first indication information to the first broadband signal when sending the first broadband signal to the AP. The first instruction information is used to indicate that the STA does not receive the feature narrowband signal. In this case, the AP may adjust, based on the first instruction information, a subsequently sent narrowband signal, for example, adjust a sending frequency, a modulation and coding scheme, a sending waveform, and the like of the signal.

In one embodiment, before that the STA receives, by using the primary radio, a response message sent by the AP, the method 700 may further include: disabling, by the STA, the primary radio. That the STA receives, by using the primary radio, a response message sent by the AP includes: enabling, by the STA, the primary radio at a preset moment, and receiving the response message sent by the AP.

In one embodiment, the AP may send the response message to the STA at a moment agreed on by the AP and the STA, namely, a preset moment. The STA may enter a mode 1 before the preset moment. The STA enters the mode 0 at the preset moment, and receives the response message. In this way, standby power consumption of the STA may be reduced.

In one embodiment, before that a STA regularly enables primary radio, the method 700 may further include: receiving, by the STA by using the secondary radio, the feature narrowband signal sent by the AP, where the feature narrowband signal is used to enable the primary radio; and enabling, by the STA, the primary radio based on the feature narrowband signal. In other words, according to the data transmission method in this embodiment of this application, the STA may enter the mode 0 by combining two methods: waking up the STA by using the feature narrowband signal and regularly enabling the primary radio.

In one embodiment, before that the STA sends a first broadband signal to an AP by using the primary radio, the method 700 includes: receiving, by the STA by using the primary radio, a second broadband signal sent by the AP after a response to the feature narrowband signal expires. That the STA sends a first broadband signal to an AP by using the primary radio includes: sending, by the STA to the AP, the first broadband signal that responds to the second broadband signal.

In one embodiment, the STA may periodically enter the mode 0, and receive a broadband signal sent by the AP, for example, the second broadband signal. By successfully receiving the broadband signal from the AP, the STA may determine that the STA is located in the broadband coverage area of the AP. This manner is applicable to a scenario in which reliability of a narrowband signal is greater than that of a broadband signal. The broadband signal is successfully received, to ensure that the STA can also receive the narrowband signal sent by the AP.

Figure 8:
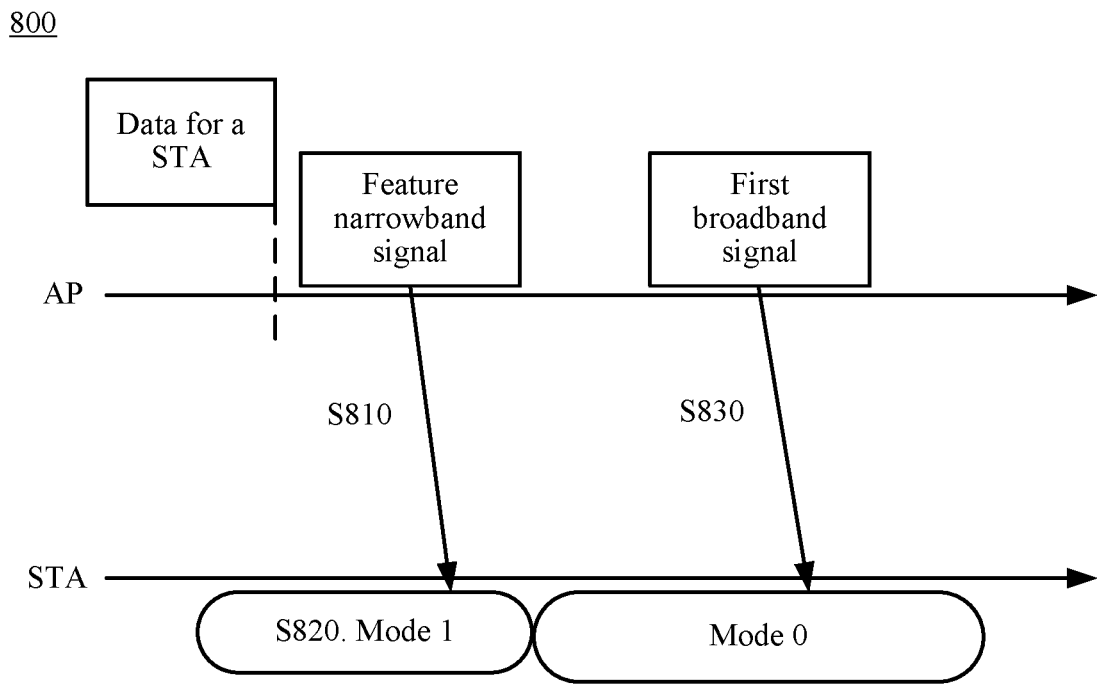
FIG. 8 is a schematic flowchart of a data transmission method according to an embodiment of this application.

FIG. 8 shows a data transmission method 800 according to another embodiment of this application.

Operation S810. An AP sends a feature narrowband signal to a STA.

The feature narrowband signal may carry time information, and the time information is used to indicate a moment at which the AP sends a first broadband signal. The first broadband signal may be data for the STA.

In addition, the first broadband signal may be a control frame sent by the AP. The control frame may include trigger information. The trigger information is used to indicate a transmission manner of uplink transmission from the STA, for example, a sending frequency, a sending waveform, and a modulation and coding scheme in uplink transmission. This is not limited in this embodiment of this application.

Operation S820. The STA enables primary radio based on the feature narrowband signal.

Operation S830. The STA receives, by using the primary radio, a first broadband signal sent by the AP at a moment at which the AP sends the first broadband signal.

For example, the AP sends data to the STA. In one embodiment, when the AP needs to send the data to the STA, the AP may first send the feature narrowband signal to the STA, to trigger the STA to enter a mode 0. In addition, the AP may further add the time information to the feature narrowband signal, so that the STA learns of a moment at which the AP sends the data. The STA may enter a mode 1 before the moment at which the AP sends the data, and then enter the mode 0 at the moment at which the AP sends the data, to receive the data sent by the AP. In this case, power consumption of the STA can be reduced, and standby duration can be extended.

In this embodiment of this application, the STA may enter the mode 1 if the STA does not receive the first broadband signal before a preset time expires.

The AP may indicate, in the first broadband signal, that there is downlink data for the STA, and therefore, the STA keeps enabling the primary radio within a preset time period (within a preset time length starting from a time at which the first broadband signal is received). When the present time period expires, the STA may disable the primary radio and enter the mode 1. The AP may instruct, by using a more data bit in a Media Access Control (media access control, MAC) frame, the STA to maintain the mode 0. Alternatively, the AP instructs, by using an EoSP bit in an 802.11 MAC frame, the STA to maintain the mode 0. Alternatively, the AP instructs, by using a PSM bit, the STA to maintain the mode 0. Alternatively, the AP instructs, by using an A-control field in an 802.11 MAC header, the STA to maintain the mode 0.

In this embodiment of this application, the STA may disable the primary radio after receiving first or $n^{th}$ data transmission or after a specified time.

In one embodiment, the STA may notify the AP that the STA is to disable the primary radio, and the AP sends an acknowledgement or reply frame. The STA disables the primary radio after receiving the acknowledgement or reply frame.

In one embodiment, the AP may instruct the STA to disable the primary radio, the STA sends an acknowledgement or reply frame, and then the STA may disable the primary radio.

In one embodiment, the method may further include: sending, by the STA, a second broadband signal to the AP, where the second broadband signal is used to notify that the STA successfully receives the first broadband signal.

In one embodiment, the STA may send the second broadband signal to the AP after receiving the first broadband signal. In this case, after receiving the second broadband signal, the AP may determine that the STA has successfully received the first broadband signal or the primary radio of the STA has been enabled.

In one embodiment, the first broadband signal may include a transmission parameter of the second broadband signal, and the transmission parameter may include at least one of a plurality of transmission parameters of the second broadband signal such as a modulation and coding scheme, a sending frequency, a sending time length, and an occupied resource block. The second signal is transmitted based on the transmission parameter.

In this embodiment of this application, when reliability or a coverage area of a narrowband signal is greater than that of a broadband signal, the STA may periodically enable the primary radio, and listen to a beacon frame sent by the AP, to determine whether the STA is within a coverage area of the AP. When the STA successfully receives a broadband signal, it may be ensured that the STA can also receive a narrowband signal sent by the AP. When reliability or a coverage area of a broadband signal is greater than that of a narrowband signal, the STA receives the narrowband signal by using secondary radio, and may determine, by successfully receiving a narrowband signal from the AP, that the STA is within the coverage area of the AP. When the STA successfully receives the narrowband signal, it may be ensured that the STA can also receive a broadband signal sent by the AP. The STA may determine, by simultaneously using the foregoing two methods, whether the STA is within the coverage area of the AP, namely, whether the STA can receive a wake-up signal sent by the AP and can communicate with the AP by using the broadband signal.

In another implementation, the narrowband signal may carry a signal type indication, and the signal type indication is used to notify the STA that the AP is to send a beacon frame or another frame. After receiving the narrowband signal, the STA may enable the primary radio, and listen to the beacon frame or the another frame sent by the AP. When receiving the beacon frame or the another frame, the STA may determine that the STA is within the coverage area of the AP.

When determining that the STA is within the coverage area of the AP, the STA may feed back to the AP that the STA is within the coverage area of the AP. After determining that the STA is within the coverage area of the AP, the AP may send an acknowledgement frame to the STA, to indicate that the AP determines that the AP learns that the STA is within the coverage area of the AP.

On the contrary, if the STA is not within the coverage area of the AP, when the AP receives no feedback from the STA within a period of time, the AP may determine that the STA has moved out of the coverage area of the AP. In this case, the AP may clear context information of the STA, and data or a packet to be sent to the STA in a buffer. The STA may report, to another entity or module in the system, a disconnection or another connection for transmitting data.

In this embodiment of this application, different devices or services have different power consumption requirements and transmission reliability requirements. The STA and the AP may determine, through negotiation, that a wake-up procedure is one or more of wake-up procedures used in this application. The STA and the AP may negotiate the wake-up procedure when the STA and the AP are associated, in a message that is last received or sent before a woken-up device enters a sleep state, or in a sleep negotiation message. The STA and the AP may add a wake-up indication to an association request frame, an association response frame, a message that is last received or sent before the STA enters a sleep state, or a sleep negotiation message, and the wake-up indication is used to indicate that one or more of a plurality of procedures used in this application are used for subsequent waking up.

The foregoing describes the data transmission method according to the embodiments of this application in detail with reference to FIG. 3 to FIG. 8. The following describes a data transmission apparatus according to the embodiments of this application with reference to FIG. 9 to FIG. 12.

Figure 9:
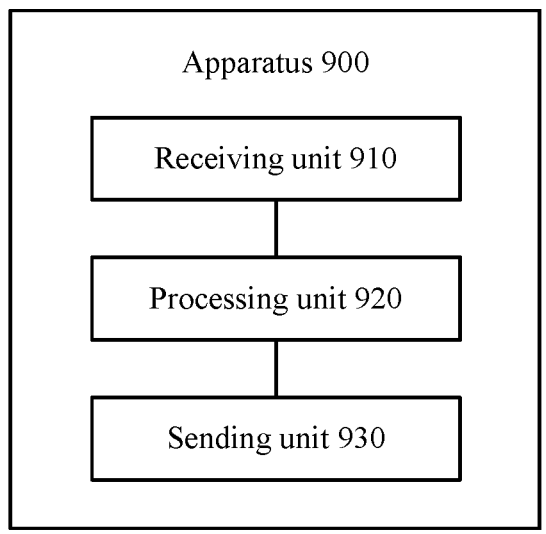
FIG. 9 is a schematic block diagram of a data transmission apparatus according to an embodiment of this application.

FIG. 9 is a schematic block diagram of a data transmission apparatus 900 according to an embodiment of this application. As shown in FIG. 9, the apparatus 900 includes a receiving unit 910, a processing unit 920, and a sending unit 930.

The receiving unit 910 is configured to receive, by using secondary radio, a feature narrowband signal sent by a transmit end.

The processing unit 920 is configured to enable primary radio based on the feature narrowband signal received by the receiving unit 910. A receiving bandwidth of the secondary radio is less than a receiving bandwidth and a sending bandwidth of the primary radio.

The sending unit 930 is configured to send a first broadband signal to the transmit end by using the primary radio. The first broadband signal is used to notify the transmit end that the processing unit 920 has enabled the primary radio.

The units of the data transmission apparatus 900 according to this embodiment of this application and the foregoing other operations or functions are respectively intended to implement corresponding procedures executed by a receive end (for example, a STA) in the foregoing methods. For brevity, details are not described herein again.

Therefore, according to the data transmission apparatus in this embodiment of this application, that the primary radio has been enabled is fed back to the transmit end, for example, is fed back to the transmit end by using the first broadband signal, so that the transmit end may determine that the receive end has enabled the primary radio. In this case, the transmit end may send data to the receive end after ensuring that the receive end enables the primary radio, so that downlink transmission reliability of the transmit end can be improved.

Figure 10:
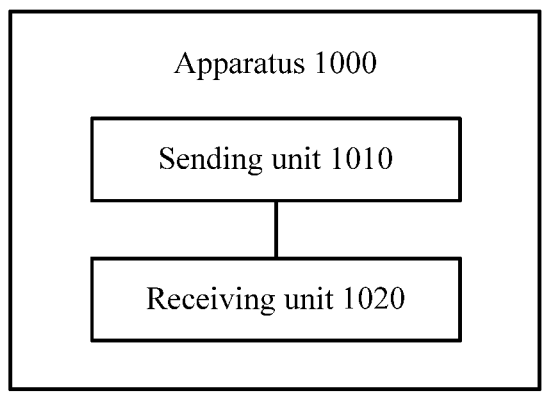
FIG. 10 is a schematic block diagram of a data transmission apparatus according to an embodiment of this application.

FIG. 10 is a schematic block diagram of a data transmission apparatus 1000 according to an embodiment of this application. As shown in FIG. 10, the apparatus 1000 includes a sending unit 1010 and a receiving unit 1020.

The sending unit 1010 is configured to send a feature narrowband signal to a receive end. The feature narrowband signal is used to enable primary radio of the receive end, the receive end further includes secondary radio, and a receiving bandwidth of the secondary radio is less than a receiving bandwidth and a sending bandwidth of the primary radio.

The receiving unit 1020 is configured to receive a first broadband signal sent by the receive end based on the feature narrowband signal sent by the sending unit 1010. The first broadband signal is used to notify that the receive end has enabled the primary radio.

The units of the data transmission apparatus 1000 according to this embodiment of this application and the foregoing other operations or functions are respectively intended to implement corresponding procedures executed by a transmit end (for example, an AP) in the foregoing methods. For brevity, details are not described herein again.

Therefore, the data transmission apparatus in this embodiment of this application may determine, by using feedback (for example, the first broadband signal) from the receive end, that the receive end has enabled the primary radio. In this case, the data transmission apparatus in this embodiment of this application may send data to the receive end after ensuring that the receive end enables the primary radio, so that downlink transmission reliability of the transmit end can be improved.

Figure 11:
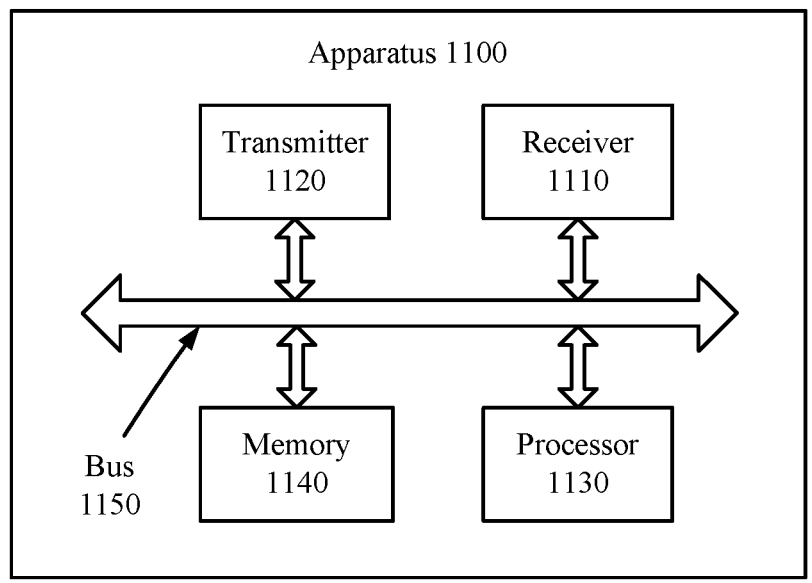
FIG. 11 is a schematic structural diagram of a data transmission apparatus according to an embodiment of this application.

FIG. 11 is a schematic structural diagram of a data transmission apparatus 1100 according to an embodiment of this application. As shown in FIG. 11, the apparatus 1100 includes a receiver 1110, a transmitter 1120, a processor 1130, a memory 1140, and a bus system 1150. The receiver 1110, the transmitter 1120, the processor 1130, and the memory 1140 are connected by using the bus system 1150. The memory 1140 is configured to store an instruction. The processor 1130 is configured to execute the instruction stored in the memory 1140, to control the receiver 1110 to receive a signal and control the transmitter 1120 to send a signal.

The receiver 1110 is configured to receive, by using secondary radio, a feature narrowband signal sent by a transmit end.

The processor 1130 is configured to enable primary radio based on the feature narrowband signal received by the receiver 1110. A receiving bandwidth of the secondary radio is less than a receiving bandwidth and a sending bandwidth of the primary radio.

The transmitter 1120 is configured to send a first broadband signal to the transmit end by using the primary radio. The first broadband signal is used to notify the transmit end that the processor 1130 has enabled the primary radio.

It should be understood that in this embodiment of this application, the processor 1130 may be a central processing unit (central processing unit, CPU), or the processor 1130 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory 1140 may include a read-only memory and a random access memory, and provides an instruction and data to the processor 1130. A part of the memory 1140 may further include a nonvolatile random access memory. For example, the memory 1140 may further store information about a device type.

The bus system 1150 may include a power bus, a control bus, a status signal bus, and the like in addition to a data bus. However, for clarity of description, various buses are marked as the bus system 1150 in the figure.

In an implementation process, each operation of the foregoing method may be completed by using an integrated logic circuit of hardware in the processor 1130 or an instruction in a form of software. The operations of the data transmission methods in the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1140, and the processor 1130 reads information in the memory 1140 and implements the operations of the foregoing method in combination with hardware of the processor 1130. To avoid repetition, details are not described herein.

The units of the data transmission apparatus 1100 according to this embodiment of this application and the foregoing other operations or functions are respectively intended to implement corresponding procedures executed by a receive end (for example, a STA) in the foregoing methods. For brevity, details are not described herein again.

Therefore, according to the data transmission apparatus in this embodiment of this application, that the primary radio has been enabled is fed back to the transmit end, for example, is fed back to the transmit end by using the first broadband signal, so that the transmit end may determine that the receive end has enabled the primary radio. In this case, the transmit end may send data to the receive end after ensuring that the receive end enables the primary radio, so that downlink transmission reliability of the transmit end can be improved.

Figure 12:
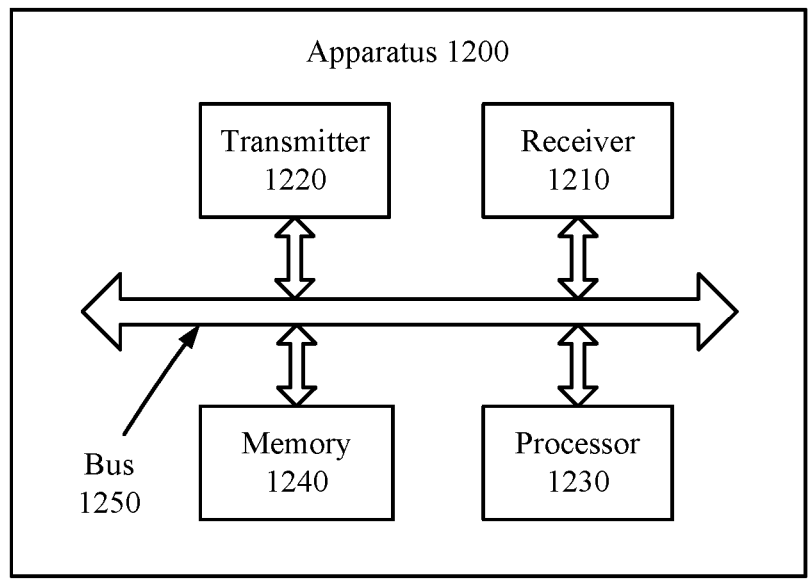
FIG. 12 is a schematic structural diagram of a data transmission apparatus according to an embodiment of this application.

FIG. 12 is a schematic structural diagram of a data transmission apparatus 1200 according to an embodiment of this application. As shown in FIG. 12, the apparatus 1200 includes a receiver 1210, a transmitter 1220, a processor 1230, a memory 1240, and a bus system 1250. The receiver 1210, the transmitter 1220, the processor 1230, and the memory 1240 are connected by using the bus system 1250. The memory 1240 is configured to store an instruction. The processor 1230 is configured to execute the instruction stored in the memory 1240, to control the receiver 1210 to receive a signal and control the transmitter 1220 to send a signal.

The transmitter 1220 is configured to send a feature narrowband signal to a receive end. The feature narrowband signal is used to enable primary radio of the receive end, the receive end further includes secondary radio, and a receiving bandwidth of the secondary radio is less than a receiving bandwidth and a sending bandwidth of the primary radio.

The receiver 1210 is configured to receive a first broadband signal sent by the receive end based on the feature narrowband signal sent by the transmitter 1220. The first broadband signal is used to notify that the receive end has enabled the primary radio.

It should be understood that in this embodiment of this application, the processor 1230 may be a central processing unit (central processing unit, CPU), or the processor 1230 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory 1240 may include a read-only memory and a random access memory, and provides an instruction and data to the processor 1230. A part of the memory 1240 may further include a nonvolatile random access memory. For example, the memory 1240 may further store information about a device type.

The bus system 1250 may include a power bus, a control bus, a status signal bus, and the like in addition to a data bus. However, for clarity of description, various buses are marked as the bus system 1250 in the figure.

In an implementation process, each operation of the foregoing method may be completed by using an integrated logic circuit of hardware in the processor 1230 or an instruction in a form of software. The operations of the data transmission methods in the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1240, and the processor 1230 reads information in the memory 1240 and implements the operations of the foregoing method in combination with hardware of the processor 1230. To avoid repetition, details are not described herein.

The units of the data transmission apparatus 1200 according to this embodiment of this application and the foregoing other operations or functions are respectively intended to implement corresponding procedures executed by a transmit end (for example, an AP) in the foregoing methods. For brevity, details are not described herein again.

Therefore, the data transmission apparatus in this embodiment of this application may determine, by using feedback (for example, the first broadband signal) from the receive end, that the receive end has enabled the primary radio. In this case, the data transmission apparatus in this embodiment of this application may send data to the receive end after ensuring that the receive end enables the primary radio, so that downlink transmission reliability of the transmit end can be improved.

An embodiment of this application further provides a data transmission apparatus, and the apparatus includes a processing unit, a receiving unit, and a sending unit.

The processing unit is configured to regularly enable primary radio.

The receiving unit is configured to receive, by using the primary radio, a first broadband signal sent by a transmit end.

The sending unit is configured to send a second broadband signal to the transmit end by using the primary radio. The second broadband signal is used to notify that the receiving unit successfully receives the first broadband signal.

Therefore, according to the data transmission apparatus in this embodiment of this application, that the primary radio has been enabled is fed back to the transmit end, for example, is fed back to the transmit end by using the second broadband signal, so that the transmit end may determine that a receive end has enabled the primary radio. In this case, the transmit end may send data to the receive end after ensuring that the receive end enables the primary radio, so that downlink transmission reliability of the transmit end can be improved.

In one embodiment, the receiving unit is further configured to receive, by using the primary radio, a response message sent by the transmit end. The response message is used to notify that the transmit end successfully receives the second broadband signal.

The units of the data transmission apparatus according to this embodiment of this application and the foregoing operations or functions are respectively intended to implement corresponding procedures executed by the receive end (for example, a STA) in the foregoing method 700. For brevity, details are not described herein again.

An embodiment of this application further provides a data transmission apparatus, and the apparatus includes a sending unit and a receiving unit.

The sending unit is configured to send a first broadband signal to a receive end.

The receiving unit is configured to receive a second broadband signal sent by the receive end. The second broadband signal is used to notify that the receive end successfully receives the first broadband signal.

Therefore, the data transmission apparatus in this embodiment of this application may determine, by using feedback (for example, the first broadband signal) from the receive end, that the receive end has enabled the primary radio. In this case, the data transmission apparatus in this embodiment of this application may send data to the receive end after ensuring that the receive end enables the primary radio, so that downlink transmission reliability of a transmit end can be improved.

In one embodiment, the sending unit is further configured to send a response message to the receive end. The response message is used to notify that the receiving unit successfully receives the second broadband signal.

The units of the data transmission apparatus according to this embodiment of this application and the foregoing other operations or functions are respectively intended to implement corresponding procedures executed by the transmit end (for example, an AP) in the foregoing method 700. For brevity, details are not described herein again.

An embodiment of this application further provides a data transmission apparatus, and the apparatus includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal.

The processor is configured to regularly enable primary radio.

The receiver is configured to receive, by using the primary radio, a first broadband signal sent by a transmit end.

The transmitter is configured to send a second broadband signal to the transmit end by using the primary radio. The second broadband signal is used to notify that the receiver successfully receives the first broadband signal.

It should be understood that in this embodiment of this application, the processor may be a central processing unit (central processing unit, CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory may include a read-only memory and a random access memory, and provides an instruction and data to the processor. A part of the memory may further include a nonvolatile random access memory. For example, the memory may further store information about a device type.

The bus system may include a power bus, a control bus, a status signal bus, and the like in addition to a data bus. However, for clarity of description, various buses are marked as the bus system in the figure.

In an implementation process, each operation of the foregoing method may be completed by using an integrated logic circuit of hardware in the processor or an instruction in a form of software. The operations of the data transmission methods in the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the operations in the foregoing methods in combination with hardware of the processor. To avoid repetition, details are not described herein.

The units of the data transmission apparatus according to this embodiment of this application and the foregoing other operations or functions are respectively intended to implement corresponding procedures executed by a receive end (for example, a STA) in the foregoing method 700. For brevity, details are not described herein again.

Therefore, according to the data transmission apparatus in this embodiment of this application, that the primary radio has been enabled is fed back to the transmit end, for example, is fed back to the transmit end by using the first broadband signal, so that the transmit end may determine that the receive end has enabled the primary radio. In this case, the transmit end may send data to the receive end after ensuring that the receive end enables the primary radio, so that downlink transmission reliability of the transmit end can be improved.

An embodiment of this application further provides a data transmission apparatus, and the apparatus includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal.

The processor is configured to regularly enable primary radio.

The transmitter is configured to send a first broadband signal to a receive end.

The receiver is configured to receive a second broadband signal sent by the receive end. The second broadband signal is used to notify that the receive end successfully receives the first broadband signal.

It should be understood that in this embodiment of this application, the processor may be a central processing unit (central processing unit, CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory may include a read-only memory and a random access memory, and provides an instruction and data to the processor. A part of the memory may further include a nonvolatile random access memory. For example, the memory may further store information about a device type.

The bus system may include a power bus, a control bus, a status signal bus, and the like in addition to a data bus. However, for clarity of description, various buses are marked as the bus system in the figure.

In an implementation process, each operation of the foregoing method may be completed by using an integrated logic circuit of hardware in the processor or an instruction in a form of software. The operations of the data transmission methods in the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the operations in the foregoing methods in combination with hardware of the processor. To avoid repetition, details are not described herein.

The units of the data transmission apparatus according to this embodiment of this application and the foregoing other operations or functions are respectively intended to implement corresponding procedures executed by a transmit end (for example, an AP) in the foregoing method 700. For brevity, details are not described herein again.

Therefore, the data transmission apparatus in this embodiment of this application may determine, by using feedback (for example, the second broadband signal) from the receive end, that the receive end has enabled the primary radio. In this case, the data transmission apparatus in this embodiment of this application may send data to the receive end after ensuring that the receive end enables the primary radio, so that downlink transmission reliability of the transmit end can be improved.

An embodiment of this application further provides a data transmission apparatus, and the apparatus includes a receiving unit, a processing unit, and a sending unit.

The receiving unit is configured to receive, by using secondary radio, a feature narrowband signal sent by a transmit end. The feature narrowband signal carries time information, and the time information is used to indicate a moment at which the transmit end sends a first broadband signal.

The processing unit is configured to enable primary radio based on the feature narrowband signal. A receiving bandwidth of the secondary radio is less than a receiving bandwidth and a sending bandwidth of the primary radio.

The receiving unit is configured to receive, by using the primary radio, the first broadband signal sent by the transmit end at the moment at which the transmit end sends the first broadband signal.

In one embodiment, when the transmit end needs to send data to a receive end, the transmit end may first send the feature narrowband signal to the receive end to trigger the receive end to enable the primary radio. In addition, the transmit end may further add the time information to the feature narrowband signal, so that the receive end learns of a moment at which the transmit end sends the data. The receive end may disable the primary radio before the moment at which the transmit end sends the data. The receive end may enable the primary radio again at the moment at which the transmit end sends the data, to receive the data sent by the transmit end. Therefore, according to the data transmission apparatus in this embodiment of this application, power consumption can be reduced, and standby duration can be extended.

In one embodiment, the sending unit is configured to send, to the transmit end by using the primary radio, a second broadband signal that responds to the first broadband signal. The second broadband signal is used to notify that the receiving unit successfully receives the first broadband signal.

The units of the data transmission apparatus according to this embodiment of this application and the foregoing other operations or functions are respectively intended to implement corresponding procedures executed by the receive end (for example, a STA) in the foregoing method 800. For brevity, details are not described herein again.

An embodiment of this application further provides a data transmission apparatus, and the apparatus includes a sending unit and a receiving unit.

The sending unit is configured to send a feature narrowband signal to a receive end. The feature narrowband signal carries time information, and the time information is used to indicate a moment at which the sending unit sends a first broadband signal.

The sending unit is configured to send the first broadband signal to the receive end at the moment at which the sending unit sends the first broadband signal.

In one embodiment, when a transmit end needs to send data to the receive end, the transmit end may first send the feature narrowband signal to the receive end to trigger the receive end to enable the primary radio. In addition, the transmit end may further add the time information to the feature narrowband signal, so that the receive end learns of a moment at which the transmit end sends the data. The receive end may disable the primary radio before the moment at which the transmit end sends the data. The receive end may enable the primary radio again at the moment at which the transmit end sends the data, to receive the data sent by the transmit end. Therefore, according to the data transmission apparatus in this embodiment of this application, power consumption can be reduced, and standby duration can be extended.

In one embodiment, the receiving unit is further configured to receive a second broadband signal sent by the receive end to respond to the first broadband signal. The second broadband signal is used to notify that the receive end successfully receives the first broadband signal.

The units of the data transmission apparatus according to this embodiment of this application and the foregoing other operations or functions are respectively intended to implement corresponding procedures executed by the transmit end (for example, an AP) in the foregoing method 800. For brevity, details are not described herein again.

An embodiment of this application further provides a data transmission apparatus, and the apparatus includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal.

The receiver is configured to receive, by using secondary radio, a feature narrowband signal sent by a transmit end. The feature narrowband signal carries time information, and the time information is used to indicate a moment at which the transmit end sends a first broadband signal.

The processor is configured to enable primary radio based on the feature narrowband signal. A receiving bandwidth of secondary radio is less than a receiving bandwidth and a sending bandwidth of the primary radio.

The receiver is configured to receive, by using the primary radio, the first broadband signal sent by the transmit end at the moment at which the transmit end sends the first broadband signal.

It should be understood that in this embodiment of this application, the processor may be a central processing unit (central processing unit, CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory may include a read-only memory and a random access memory, and provides an instruction and data to the processor. A part of the memory may further include a nonvolatile random access memory. For example, the memory may further store information about a device type.

The bus system may include a power bus, a control bus, a status signal bus, and the like in addition to a data bus. However, for clarity of description, various buses are marked as the bus system in the figure.

In an implementation process, each operation of the foregoing method may be completed by using an integrated logic circuit of hardware in the processor or an instruction in a form of software. The operations of the data transmission methods in the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the operations in the foregoing methods in combination with hardware of the processor. To avoid repetition, details are not described herein.

The units of the data transmission apparatus according to this embodiment of this application and the foregoing other operations or functions are respectively intended to implement corresponding procedures executed by a receive end (for example, a STA) in the foregoing method 800. For brevity, details are not described herein again.

Before the transmit end needs to send data to the receive end, the transmit end may first send the feature narrowband signal to the receive end to trigger the receive end to enable the primary radio. In addition, the transmit end may further add the time information to the feature narrowband signal, so that the receive end learns of a moment at which the transmit end sends the data. The receive end may disable the primary radio before the moment at which the transmit end sends the data. The receive end may enable the primary radio again at the moment at which the transmit end sends the data, to receive the data sent by the transmit end. Therefore, according to the data transmission apparatus in this embodiment of this application, power consumption can be reduced, and standby duration can be extended.

An embodiment of this application further provides a data transmission apparatus, and the apparatus includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal.

The transmitter is configured to send a feature narrowband signal to a receive end. The feature narrowband signal carries time information, and the time information is used to indicate a moment at which the transmitter sends a first broadband signal.

The transmitter is configured to send the first broadband signal to the receive end at the moment at which the transmitter sends the first broadband signal.

It should be understood that in this embodiment of this application, the processor may be a central processing unit (central processing unit, CPU), or the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory may include a read-only memory and a random access memory, and provides an instruction and data to the processor. A part of the memory may further include a nonvolatile random access memory. For example, the memory may further store information about a device type.

The bus system may include a power bus, a control bus, a status signal bus, and the like in addition to a data bus.

However, for clarity of description, various buses are marked as the bus system in the figure.

In an implementation process, each operation of the foregoing method may be completed by using an integrated logic circuit of hardware in the processor or an instruction in a form of software. The operations of the data transmission methods in the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the operations in the foregoing methods in combination with hardware of the processor. To avoid repetition, details are not described herein.

The units of the data transmission apparatus according to this embodiment of this application and the foregoing other operations or functions are respectively intended to implement corresponding procedures executed by a transmit end (for example, an AP) in the foregoing method 800. For brevity, details are not described herein again.

Before the transmit end needs to send data to the receive end, the transmit end may first send the feature narrowband signal to the receive end to trigger the receive end to enable the primary radio. In addition, the transmit end may further add the time information to the feature narrowband signal, so that the receive end learns of a moment at which the transmit end sends the data. The receive end may disable the primary radio before the moment at which the transmit end sends the data. The receive end may enable the primary radio again at the moment at which the transmit end sends the data, to receive the data sent by the transmit end. Therefore, according to the data transmission apparatus in this embodiment of this application, power consumption can be reduced, and standby duration can be extended.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, the units and algorithm operations in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving, by a receive end by using a secondary radio, a feature narrowband signal sent by a transmit end;
   enabling, by the receive end, a primary radio based on the feature narrowband signal, wherein a receiving bandwidth of the secondary radio is less than a receiving bandwidth and a sending bandwidth of the primary radio; and
   sending, by the receive end, a first broadband signal to the transmit end by using the primary radio, wherein the first broadband signal is used to notify the transmit end that the receive end has enabled the primary radio, wherein before the receiving, by a receive end by using secondary radio, a feature narrowband signal sent by a transmit end, the method further comprising:

receiving, by the receive end, a beacon narrowband signal sent by the transmit end;

sending, by the receive end, a measurement report to the transmit end, wherein the measurement report is used to notify of at least one of a signal measurement result or a channel measurement result; and receiving, by the receive end, a wake-up configuration information sent by the transmit end based on the measurement report, wherein the wake-up configuration information is used to indicate feature information of the feature narrowband signal.

2. The method according to claim 1, wherein the feature narrowband signal carries first instruction information, and the first instruction information is used to instruct the receive end to send the first broadband signal to the transmit end after receiving the feature narrowband signal.

3. The method according to claim 1, wherein the feature narrowband signal carries second instruction information, and the second instruction information is used to instruct the receive end to send the first broadband signal to the transmit end after receiving a second broadband signal sent by the transmit end; and before the sending, by the receive end, a first broadband signal to the transmit end by using the primary radio, the method further comprising:

receiving, by the receive end, the second broadband signal sent by the transmit end, wherein the second broadband signal carries query information and transmission indication information, the query information is used to determine whether the receive end has enabled the primary radio, the transmission indication information is used to indicate a transmission manner in which the receive end sends the first broadband signal to the transmit end by using the primary radio, and the transmission manner comprises at least one piece of the following information about the first broadband signal: a sending time, an end time, a sending frequency, or a modulation and coding scheme.

4. The method according to claim 1, wherein the feature information comprises at least one piece of the following information about the feature narrowband signal:

a sending frequency, a sending waveform, a modulation and coding scheme, spread spectrum information, or a quantity of sending repetition times.

5. A data transmission method, comprising:

sending, by a transmit end, a feature narrowband signal to a receive end, wherein the feature narrowband signal is used to enable a primary radio of the receive end; and receiving, by the transmit end, a first broadband signal from the primary radio of the receive end based on the feature narrowband signal, wherein the first broadband signal is used to notify that the receive end has enabled the primary radio, wherein before the sending, by a transmit end, a feature narrowband signal to a receive end, the method further comprising:

sending, by the transmit end, a beacon narrowband signal to the receive end;

receiving, by the transmit end, a measurement report sent by the receive end, wherein the measurement report is used to notify of at least one of a signal measurement result or a channel measurement result;

determining, by the transmit end, the feature narrowband signal based on the measurement report; and sending, by the transmit end, a wake-up configuration information to the receive end, wherein the wake-up configuration information is used to indicate feature information of the feature narrowband signal.

6. The method according to claim 5, wherein the feature narrowband signal carries first instruction information, and the first instruction information is used to instruct the receive end to send the first broadband signal to the transmit end after receiving the feature narrowband signal.

7. The method according to claim 5, wherein the feature narrowband signal carries second instruction information, and the second instruction information is used to instruct the receive end to send the first broadband signal to the transmit end after receiving a second broadband signal sent by the transmit end; and before the receiving, by the transmit end, a first broadband signal sent by the receive end based on the feature narrowband signal, the method further comprising:

sending, by the transmit end, the second broadband signal to the receive end, wherein the second broadband signal carries query information and transmission indication information, the query information is used to determine whether the receive end has enabled the primary radio, the transmission indication information is used to indicate a transmission manner in which the receive end sends the first broadband signal to the transmit end by using the primary radio, and the transmission manner comprises at least one piece of the following information about the first broadband signal: a sending time, an end time, a sending frequency, or a modulation and coding scheme.

8. The method according to claim 5, wherein the feature information comprises at least one piece of the following information about the feature narrowband signal:

a sending frequency, a sending waveform, a modulation and coding scheme, spread spectrum information, or a quantity of sending repetition times.

9. A data transmission apparatus, comprising:

a receiver, configured to receive, by using a secondary radio, a feature narrowband signal sent by a transmit end;

a processor, configured to enable a primary radio based on the feature narrowband signal received by the receiver, wherein a receiving bandwidth of the secondary radio is less than a receiving bandwidth and a sending bandwidth of the primary radio; and a transmitter, configured to send a first broadband signal to the transmit end by using the primary radio, wherein the first broadband signal is used to notify the transmit end that the processor has enabled the primary radio, wherein the receiver is further configured to receive a beacon narrowband signal sent by the transmit end;

the transmitter is further configured to send a measurement report to the transmit end, wherein the measurement report is used to notify of at least one of a signal measurement result or a channel measurement result; and the receiver is further configured to receive a wake-up configuration information sent by the transmit end based on the measurement report, wherein the wake-up configuration information is used to indicate feature information of the feature narrowband signal.

10. The apparatus according to claim 9, wherein the feature narrowband signal carries first instruction information, and the first instruction information is used to instruct to send the first broadband signal to the transmit end after the receiver receives the feature narrowband signal.

11. The apparatus according to claim 9, wherein the feature narrowband signal carries second instruction information, and the second instruction information is used to instruct to send the first broadband signal to the transmit end after the receiver receives a second broadband signal sent by the transmit end; and the receiver is further configured to:
receive the second broadband signal sent by the transmit end, wherein the second broadband signal carries query information and transmission indication information, the query information is used to determine whether the processor has enabled the primary radio, the transmission indication information is used to indicate a transmission manner in which the transmitter sends the first broadband signal to the transmit end by using the primary radio, and the transmission manner comprises at least one piece of the following information about the first broadband signal: a sending time, an end time, a sending frequency, or a modulation and coding scheme.

12. The apparatus according to claim 9, wherein the feature information comprises at least one piece of the following information about the feature narrowband signal:
a sending frequency, a sending waveform, a modulation and coding scheme, spread spectrum information, or a quantity of sending repetition times.

13. A data transmission apparatus, comprising:
a transmitter, configured to send a feature narrowband signal to a receive end, wherein the feature narrowband signal is used to enable a primary radio of the receive end; and
a receiver, configured to receive a first broadband signal from the primary radio of the receive end based on the feature narrowband signal sent by the transmitter, wherein the first broadband signal is used to notify that the receive end has enabled the primary radio, wherein
the transmitter is further configured to send a beacon narrowband signal to the receive end;
the receiver is further configured to receive a measurement report sent by the receive end, wherein the measurement report is used to notify of at least one of a signal measurement result or a channel measurement result;

the apparatus further comprising:
a processor, configured to determine the feature narrowband signal based on the measurement report received by the receiver; and
the transmitter is further configured to send a wake-up configuration information to the receive end, wherein the wake-up configuration information is used to indicate feature information of the feature narrowband signal.

14. The apparatus according to claim 13, wherein the feature narrowband signal carries first instruction information, and the first instruction information is used to instruct the receive end to send the first broadband signal to the receiver after receiving the feature narrowband signal.

15. The apparatus according to claim 13, wherein the feature narrowband signal carries second instruction information, and the second instruction information is used to instruct the receive end to send the first broadband signal to the receiver after receiving a second broadband signal sent by the transmitter; and the transmitter is further configured to:
send the second broadband signal to the receive end, wherein the second broadband signal carries query information and transmission indication information, the query information is used to determine whether the receive end has enabled the primary radio, the transmission indication information is used to indicate a transmission manner in which the receive end sends the first broadband signal to the receiver by using the primary radio, and the transmission manner comprises at least one piece of the following information about the first broadband signal: a sending time, an end time, a sending frequency, or a modulation and coding scheme.

16. The apparatus according to claim 13, wherein the feature information comprises at least one piece of the following information about the feature narrowband signal:
a sending frequency, a sending waveform, a modulation and coding scheme, spread spectrum information, or a quantity of sending repetition times.

* * * * *